United States Patent
Rofougaran et al.

(10) Patent No.: US 11,902,719 B1
(45) Date of Patent: Feb. 13, 2024

(54) OPTICAL ROUTING DEVICE FOR ULTRA-FLEXIBLE AND ULTRA-RELIABLE LASER BEAM BASED WIRELESS COMMUNICATION

(71) Applicant: WIRELESS PHOTONICS LLC, Newport Beach, CA (US)

(72) Inventors: Ahmadreza Rofougaran, Newport Beach, CA (US); Bahram Jalali, Los Angeles, CA (US); Mehdi Hatamian, Mission Viejo, CA (US); Arman Rofougaran, Newport Coast, CA (US); Milan Rofougaran, Newport Coast, CA (US)

(73) Assignee: WIRELESS PHOTONICS LLC, Newport Beach, CA (US)

( * ) Notice: Subject to any disclaimer, the term of this patent is extended or adjusted under 35 U.S.C. 154(b) by 0 days.

(21) Appl. No.: 18/469,686

(22) Filed: Sep. 19, 2023

Related U.S. Application Data

(63) Continuation of application No. 18/186,995, filed on Mar. 21, 2023, now Pat. No. 11,800,261.

(51) Int. Cl.
| | | |
|---|---|---|
| H04B 10/114 | (2013.01) | |
| H04Q 11/00 | (2006.01) | |
| H02J 50/30 | (2016.01) | |
| G02B 27/10 | (2006.01) | |
| G02B 27/28 | (2006.01) | |

(52) U.S. Cl.
CPC .......... H04Q 11/0005 (2013.01); H02J 50/30 (2016.02); H04B 10/114 (2013.01); *G02B 27/1006* (2013.01); *G02B 27/286* (2013.01); *H04Q 2011/0026* (2013.01)

(58) Field of Classification Search
CPC .......................... H04B 10/114; H04Q 11/0005
See application file for complete search history.

(56) References Cited

U.S. PATENT DOCUMENTS

| | | | | |
|---|---|---|---|---|
| 11,418,256 | B1 * | 8/2022 | Mellon | H04B 10/524 |
| 2010/0260503 | A1 * | 10/2010 | Zhovnirovsky | H04B 10/803 |
| | | | | 398/118 |
| 2018/0294877 | A1 * | 10/2018 | Gupta | H04B 10/11 |
| 2023/0091416 | A1 * | 3/2023 | Fujita | H04B 10/1149 |
| | | | | 398/45 |

* cited by examiner

*Primary Examiner* — Shi K Li
(74) *Attorney, Agent, or Firm* — CHIP LAW GROUP

(57) ABSTRACT

An optical routing device that includes a mounting component which includes a rechargeable battery and a processor that communicates over-the-air with a master communication device or one or more service communication devices via RF supervisory links. The processor receives an instruction via the RF supervisory links to control a movement of the mounting component along with the optical routing component such that an angle or a direction of deflection of laser beams from an optical routing component of optical routing device is changed. The optical routing component includes two distinct laser beam handling regions configured to handle plurality of laser beams concurrently in which first laser beam in first wavelength is deflected via first region for downstream data communication in downstream path and second laser beam in second wavelength is deflected via second region for upstream data communication in upstream path for free-space optical communication independent of optical fibers.

20 Claims, 12 Drawing Sheets

OPTICAL ROUTING DEVICE FOR ULTRA-FLEXIBLE AND ULTRA-RELIABLE LASER BEAM BASED WIRELESS COMMUNICATION

CROSS-REFERENCE TO RELATED APPLICATIONS/INCORPORATION BY REFERENCE

This Patent Application makes reference to, claims priority to, claims the benefit of, and is a Continuation Application of U.S. patent application Ser. No. 18/186,995, filed on Mar. 21, 2023, which is hereby incorporated herein by reference in entirety.

FIELD OF TECHNOLOGY

Certain embodiments of the disclosure relate to a wireless communication system. More specifically, certain embodiments of the disclosure relate to an optical routing device for ultra-flexible and ultra-reliable laser beam based wireless communication, for example, in an indoor area.

BACKGROUND

Conventional wireless communication devices, such as a wireless access point (WAP) or wireless routers, are often used in an indoor area to extend the wireless coverage of an existing Wi-Fi® signal to access Internet and to increase the numbers of end devices (users) that are capable to use Wi-Fi® may connect to the WAP. However, Wi-Fi® signals by virtue of the limitation of the Wi-Fi® communication protocol have a defined range beyond which the connectivity is lost. Thus, a large number of WAPs or range extenders are used in the indoor area (e.g., an enterprise building, a home) if wireless coverage for Wi-Fi® signals are to be extended. Moreover, under ideal conditions, typically 2.4 GHz Wi-Fi© supports up to 450 Mbps or 600 Mbps, and 5 GHz Wi-Fi® supports up to 1300 Mbps. Recently, progress has been made in developing Wi-Fi® communication in 6 GHz band, for example, for Wi-Fi® 6, 6E, Wi-Fi 7 etc., for increasing data throughput. However, the technical issue of limited coverage area and signal attenuation with increasing distance from a Wi-Fi® signal broadcast device remains. This is the reason why Ethernet cables are still widely used as primary connectors in an Ethernet Local Area Network (LAN) to connect different routers, switches, hub, and gateway devices in an enterprise to provide a reliable connectivity. Ethernet connects any computer or other electronic device to its network as long as the device has an Ethernet adapter or a network card. Since all the network devices need to be connected to its individual power source, and cables need to run through walls, re-designing an enterprise LAN often becomes a herculean task. For instance, network maintenance may require changing or replacing cables and costly intermediate network devices that often causes damage to the walls and installation points for deployment or re-deployment.

Currently, certain attempts have been made to solve the technical issue of limited coverage area and signal attenuation with increasing distance from a Wi-Fi® signal broadcast device and to avoid the Ethernet cables. For example, certain conventional home mesh Wi-Fi® systems also exists that provide a comparatively wider coverage than the single Wi-Fi® signal broadcast device in an indoor area. Such conventional home mesh Wi-Fi® systems operate by broadcasting from the main router to several satellite routers, which in turn broadcast to its client devices. In this topology, the communication between the main router connected to the Internet and the satellite routers fed by the main router, is carried by the Backhaul. While the backhaul connections can be done with physical cables which offer wider bandwidth than a Wi-Fi® band, cable installation and reconfiguration are extremely costly and slow. Thus, there are many technical challenges associated with existing wireless communication systems commonly used in an indoor area. In a first example, there is the technical issue of how to provide full coverage with high signal-to-noise (SNR) in an indoor area with high-speed data connectivity to end-user devices without the need to deploy intermediate routers that process signals, for example, for signal amplification and routing. In another example, the reach and performance of existing systems (e.g., home mesh Wi-Fi® systems) are fundamentally limited by the bandwidth of a dedicated band, and by the number of intermediate routers (i.e., satellite routers) that the data must traverse in order to reach remote end-user devices. In a third example, currently, certain communication devices, such as Internet-of-Things (IoT) devices depend on high-speed Internet access to the cloud to send sensor data and receive instructions (e.g., artificial intelligence-based processing models) from cloud either directly or via a gateway device. The number of wireless sensors and IoT devices are rapidly increasing with the increase in smart homes, smart offices, enterprises, etc. Existing communication systems and Wi-Fi® standards are unbale to handle such massive number of wireless sensors and IoT devices and their quality-of-service (QoS) requirements. In such cases, it is extremely difficult and technically challenging to support these end user devices, where latency and signal noise are other technical problem with existing communication systems and network architecture when operating in a sub 10 GHz frequency, and such latency increases when more wireless access points or relay nodes or routers are introduced in the network to extend the communication range. Furthermore, it is known that certain optical beam deflectors may be used to extend the range of an optical communication system. However, conventional optical beam deflectors are mainly designed and developed for space applications or other outdoor use cases, and inherently are very complex, costly, and not practically suited for end use, like in homes or general enterprises. Moreover, conventional optical beam deflectors are either bulky, very power intensive devices, or simply are not usable or do not work as required in a laser beam based wireless communication in indoor scenarios.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

An optical routing device for ultra-flexible and ultra-reliable laser beam based wireless communication in an indoor area, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1:
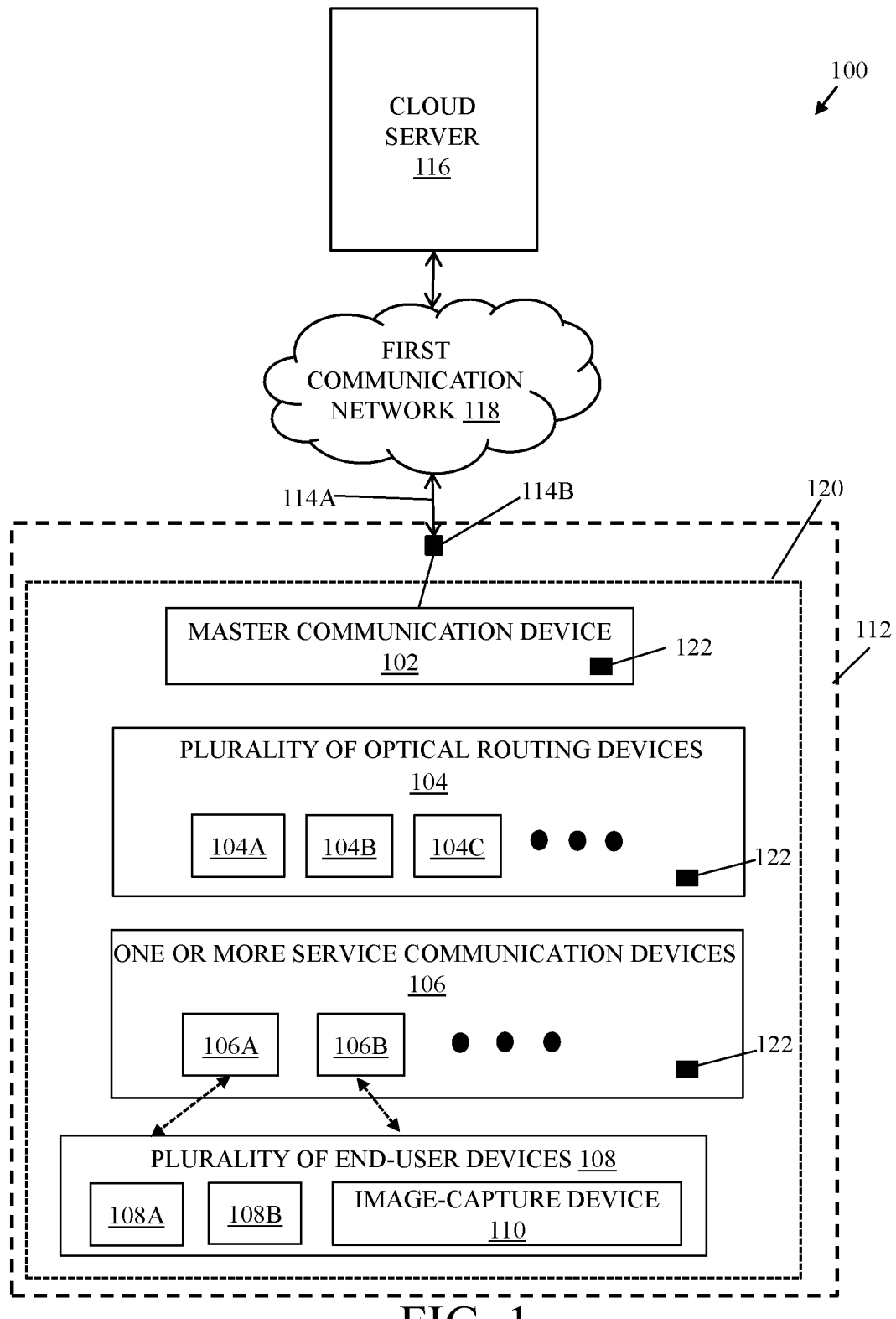
FIG. 1 is a diagram illustrating an exemplary communication system with optical routing devices, in accordance with an exemplary embodiment of the disclosure.

Certain embodiments of the disclosure may be found in an optical routing device for ultra-flexible and ultra-reliable laser beam based wireless communication, for example, in an indoor area. The optical routing device is a new device that smarty employs one or more radio frequency (RF) supervisory links to communicate with a master communication device or one or more service communication devices for monitoring and control purpose while employs a laser beam deflection capability for actual laser beam based wireless communication in a multigigabit data rate to form a laser beam based wireless network in an indoor area. The optical routing device ensures an ultra-flexible and ultra-reliable laser beam based wireless communication with significantly lower power consumption, which can be powered even by an internal power source, such as an inbuilt battery. For example, with just one external power source, such as the master communication device plugged into an external power source (e.g., an AC current), all other optical routing devices and even some service communication device may be charged remotely via optical wireless power transmission by the master communication device 102, thereby simplifying the deployment. Furthermore, beneficially, the optical routing device comprises an optical routing component that includes one or more laser beam handling regions (which performs laser beam deflection over-the-air and in some cases free-space laser beam splitting or combining) configured to handle a plurality of laser beams concurrently in which a first laser beam is deflected via a first region of the one or more laser beam handling regions for downstream data communication in a downstream path and a second laser beam is deflected via a second region of the one or more laser beam handling regions for upstream data communication in an upstream path. This not only improves network redundancy and network scalability but also enables almost near zero latency communication and an always-connected experience. The network redundancy refers to a mechanism or a way to provide multiple paths for traffic, so that data can keep flowing even in the event of a failure, and thus high network redundancy means high reliability. The term network scalability refers to an ability of a communication network to handle increasing workloads in a cost-effective and sustainable way, for example, by expanding the network's bandwidth capacity and supporting its physical expansion to new physical areas. The disclosed optical routing device is a new passive optical node that creates a smart laser-based wireless network in an indoor area with a wireless optical backhaul that ensures full coverage with high signal-to-noise (SNR) in different physical spaces including all nooks and corners of the indoor area with significantly improved high-speed data connectivity and data security to end-user devices without the need to deploy costly and bandwidth limited Wi-Fi® intermediate routers that process signals, for example, for signal amplification. The optical routing device which acts as a passive optical node of the communication system of the present disclosure further improves data transfer rates between at least two communication devices as compared to existing wireless systems (e.g., conventional wireless local area networks).

In the following description, reference is made to the accompanying drawings, which form a part hereof, and in which is shown, by way of illustration, various embodiments of the present disclosure.

FIG. 1 is a diagram illustrating an exemplary communication system with optical routing devices, in accordance with an exemplary embodiment of the disclosure. With reference to FIG. 1, there is shown a communication system 100 that may include a master communication device 102, a plurality of optical routing devices 104, one or more service communication devices 106, a plurality of end-user devices 108 in a defined indoor area 112. The plurality of end-user devices 108 may include one or more user equipment (UEs) 108A and 108B, and an image-capture device 110. There is further shown a data source 114 connected to the master communication device 102. In an implementation, the communication system 100 may include a cloud server 116 that is communicatively coupled to the master communication device 102 directly or via the data source 114. There is further shown a first communication network 118 (e.g., Internet) and a second communication network 120 (i.e., a laser beam based wireless communication network). In an implementation, each optical node (i.e., each of the plurality of optical routing devices 104, the master communication device 102, and each of the one or more service communication device 106) may include one or more sensors 122.

Each of the master communication device 102 and the one or more service communication devices 106 may be a wireless access point or a wireless router, a home gateway device, a fixed wireless access (FWA) device, or a network controller.

Each of the plurality of optical routing devices 104 may be mounted on a ceiling surface or a wall surface. Beneficially, each of the plurality of optical routing devices 104 may have at least two distinct regions (e.g., deflection regions or laser beam handling regions) to handle a pair of laser beams concurrently in which a first laser beam deflected is used for downstream data communication in the downstream path and the second laser beam that is deflected is used for upstream communication in an upstream path. The downstream path refers to communication from the master communication device 102 towards the one or more service communication devices 106. The upstream path refers to communication from the end-user devices to the one or more service communication devices 106 and further to the master communication device 102. The master communication device 102 may be a modified and intelligent wireless access point that may use an existing Wi-Fi© signal in the RF medium to control one or more of the plurality of optical routing devices 104 whereas may employ laser beams to form the second communication network 120 (i.e., the laser beam based communication network) to wirelessly communicate data in a cascaded structure or a mesh structure to reach to the one or more service communication devices 106 via the plurality of optical routing devices 104. Each of the plurality of optical routing devices 104 may be a battery-operated device, which is easy to deploy in the defined indoor area 112. Further, each of the plurality of optical routing devices 104 may not only be capable of performing the deflection function by deflecting one or more laser beams but also may be configured to perform passive power splitting or combining (e.g., using Dichroic mirrors), passive polarization splitting or combining, and/or passive laser beam wavelength splitting or combining (e.g., using wavelength division multiplexing (WDM).

The plurality of end-user devices 108 may include user equipment (UEs), or other consumer electronic devices, such as the image-capture device 110. Each of one or more UEs, such as the UEs 108A and 108B, may correspond to a telecommunication hardware used by an end-user to communicate. Alternatively stated, the UEs 108A and 108B, may refer to a combination of a mobile equipment and subscriber identity module (SIM). Examples of the one or more UEs may include, but are not limited to a smartphone, a virtual reality headset, an augment reality device, a wireless modem, a satellite television set-top box, a VoIP station, or any other customized hardware for telecommunication and Internet connectivity.

The defined indoor area 112 may be an indoor area of an enterprise, an apartment, a building, or other indoor area of a building.

The data source 114A may be a medium through which a backhaul connection is provided to the master communication device 102. Examples of the data source 114A may be a fiber optic cable, a high-speed XG communication wireless link, where "XG" refers to 5G or 6G, or a laser-based beam from an external communication device, such as an XG-enabled small cell or an XG-enabled repeater device located in an outdoor area. The modem 114B may be a gateway device or a Wi-Fi© modem that combines the functionality of a modem and a router for Internet connectivity.

The cloud server 116 includes suitable logic, circuitry, and interfaces that may be configured to communicate with the master communication device 102. In an example, the cloud server 116 may be a remote management server that is managed by a third party different from the service providers associated different cellular or wireless carrier networks or Internet service providers. In another example, the cloud server 116 may be a remote management server or a data center that is managed by a third party, or jointly managed, or managed in coordination and association with one or more of the cellular or wireless carrier networks or Internet service providers. In an implementation, the cloud server 116 may be a master cloud server or a master machine that is a part of a data center that controls an array of other cloud servers communicatively coupled to it, for load balancing, running customized applications, and efficient data management.

The first communication network 118 may include a medium through which the cloud server 116 and the master communication device 102 may communicate with each other. The master communication device 102 may be configured to obtain a first signal (e.g., data signal) from the data source 114A or the modem 114B coupled to the first communication network 118. The data source 114A or the modem 114B may be used to provide an Internet connection via the first communication network 118 from an Internet service provider or from a core network of a telecommunication network. Examples of the first communication network 118 may include, but are not limited to, at least one of a Transmission Control Protocol and Internet Protocol (TCP/IP), Hypertext Transfer Protocol (HTTP), the Internet, a cloud network, an optical fiber, a coaxial cable, or other backhaul connectivity medium.

The second communication network 120 refers to a laser beam-based wireless communication network formed by the master communication device 102 in association with the plurality of optical routing devices 104 and the one or more service communication devices 106.

The one or more sensors 122 may be provided at each optical node (i.e., each of the plurality of optical routing devices 104, the master communication device 102, and each of the one or more service communication device 106). In some cases, some sensors of the one or more sensors 122 may be deployed external to the optical node in the defined indoor area 112. Examples of the one or more sensors 122 may include, but are not limited to magnetic and gravity field sensors, accelerometers, one or more motorized altazimuth, one or more Micro Electronic Mechanical Systems (MEMS) motion sensor, gyroscopes, a gimbal, one or more image-capture devices, a geospatial sensor (e.g., a GPS sensor), and the like.

In accordance with an embodiment, the master communication device 102 may be provided at a first location in the defined indoor area 112. The master communication device 102 may be communicatively coupled to the cloud server 116 via the first communication network 118. In an implementation, the master communication device 102 may be connected to the data source 114A or the modem 114B. In another implementation, the master communication device 102 may be integrated with the modem 114B (i.e., the functionalities of a modem, such as a Wi-Fi® modem, may be integrated with the master communication device 102). A service communication device, such as the service communication device 106A, may be provided at a second location in the defined indoor area 112. In an implementation, the service communication device 106A may be provided at the second location where the signal strength is below a threshold value, for example less than 20 or 30 decibels. In certain scenarios, there may be no-line-of-sight (NLOS) between the master communication device 102 and the service communication device 106A. In some implementation, multiple service communication devices, such as the one or more service communication devices 106, may be provided in the defined indoor area 112, where the signal strength is below a threshold value, e.g., a low SNR value, such as less than 20 or 30 decibels. The threshold value may be a default threshold value pre-defined in the master communication device 102 or may be user-configurable value that may be defined by a user. For example, an application installed in a smartphone may be used to connect to the master communication device 102 and set or update the threshold value. Alternatively, the threshold value may be remotely configured at the master communication device 102 from the cloud server 116.

The plurality of optical routing devices 104 may be distributed at a plurality of locations in the defined indoor area 112 different from the first location and the second location. Each of the plurality of optical routing devices 104 may also be referred to as passive optical beam handling devices. Advantageously, the plurality of optical routing devices 104 may be battery-operated optical nodes. In an implementation, one or more of the plurality of optical routing devices 104 may be placed on or integrated with an electromechanical turret (also referred to as "eyeball"). The communication system 100 integrates optical wireless links that are reconfigurable via the battery-operated optical routing devices, such as the plurality of optical routing devices 104, which routes data signals via laser beams (i.e., used for the optical wireless links) to different nodes, such as the one or more service communication devices 106, according to instructions provided by the master communication device 102 or the cloud server 116.

In an implementation, the master communication device 102 may be configured to indicate where to install the plurality of optical routing devices 104. In order to indicate different installation positions of the plurality of optical routing devices 104, the master communication device 102 may be configured to direct a pencil laser beam in a visible light spectrum to the optical routing device 104A in the defined indoor area 112. For example, the master communication device 102 may direct the pencil laser beam in the visible light spectrum pointing towards a point in a wall near the ceiling or a point in the ceiling in the defined indoor area 112, where both points are in a line-of-sight of the master communication device 102. After the optical routing device 104A is installed at the selected point, the master communication device 102 may be configured to control a movement of the optical routing device 104A and direct the pencil laser beam in the visible light spectrum towards the optical routing device 104A, which further deflects the pencil laser beam to a plurality of points in the defined indoor area 112. Based on at least where the service communication device, such as the service communication device 106A, is to be placed, one point from the plurality of points is selected to install the optical routing device 104B of the plurality of optical routing devices 104 (e.g., the optical routing devices 104A, 104B, 104C, . . . , 104N). Similarly, the third, fourth, and other optical routing devices may be installed directed by the master communication device 102.

In another example, the master communication device 102 may be configured to acquire a visual data item, such as an image, a video, or a three-dimensional (3D) map of the defined indoor area 112. Such visual data item may be captured from the application installed in the smartphone held by a user, from any image-capture device, such as the image-capture device 110. Such visual data item may be pre-captured or captured in real time and acquired by the master communication device 102. Thereafter, the master communication device 102 may be further configured to process the visual data item to determine a plurality of different points in the defined indoor area 112 where the plurality of optical routing devices 104 may be placed. Such placement forms a cascaded or a mesh network of the plurality of optical routing devices 104 to cause the master communication device 102 to reach to the one or more service communication devices 106. In another example, one or more 3D mapping cameras and digital twin technology can optionally be used to plan the location of the optical nodes, by creating an immersive 3D model of the operating environment. In yet another example, the plurality of optical routing devices 104 may be manually placed at the plurality of different locations in the defined indoor area 112 without assistance from the master communication device 102.

Due to the line-of-sight (LOS) nature of laser beam transmission, misalignment of a laser transmitter and a laser receiver, known as a pointing error, may reduce data transmission fidelity or hinder such transmissions. In one aspect of the present disclosure, the installation of each optical node (i.e., each of the plurality of optical routing devices 104, the master communication device 102, and each of the one or more service communication device 106) may be performed with proper alignment in a manner that is easy, robust, and can be done even by a non-technical person. The first step may be proper mounting of all the optical nodes (i.e., each of the plurality of optical routing devices 104, the master communication device 102, and each of the one or more service communication device 106) on a hard surface such as a wall, ceiling, or pole. To this end, laser-levelling tools, may be used to project horizontal and vertical visible laser lines on such hard surfaces to guide the positioning of the optical nodes to ensure a rough or coarse initial alignment.

In an implementation, a coarse alignment may be executed using measurements of the Earth's magnetic field to work out the orientation (i.e., the heading) and the gravitational field to sense the tilt (i.e., the level) of the optical nodes including the laser transmitter, and the laser receiver. Each optical node (i.e., each of the plurality of optical routing devices 104, the master communication device 102, and each of the one or more service communication device 106), may include one or more sensors 122, such as magnetic and gravity field sensors, which may be used to measure the direction of the Magnetic North and a downward direction towards earth surface at the location of the one or more sensors 122.

In an implementation, the one or more sensors 122 may include three magnetic field sensors, which may be provided at each optical node (i.e., each of the plurality of optical routing devices 104, the master communication device 102, and the one or more service communication device 106). The three magnetic field sensors may be positioned perpendicular to each other, which may be used to find a local direction of the earth's Magnetic North. The magnetic field sensors may employ an optional declination correction to relate the magnetic north to the true north. Further, the one or more sensors 122 may include three accelerometers, which may sense gravity to provide tilt information (i.e., to evaluate which way is downwards). Using the orientation and the tilt (i.e., level) data, a motorized altazimuth (i.e., one of the one or more sensors 122) may be used that may automatically point and align two optical nodes together to establish a wireless laser beam communication. In an example, the one or more sensors 122 may further include a Micro Electronic Mechanical Systems (MEMS) motion sensor, which may have a 3-axis accelerometer as well as a 3-axis gyroscope, may be used.

In another implementation, in order to achieve leveling, a gimbal similar to that used in ships, to maintain horizontal levels for compasses, stoves, lights etc., may be employed. In yet another implementation, the one or more sensors 122 may include a miniature pendulum, which may be used to maintain a precise horizontal level with respect to the downward force on the pendulum. The plurality of the orientation, level and location data may be communicated to the master communication device 102 or the cloud server 116 (i.e., a network management software), for visualization, troubleshooting, optimization, and monitoring of the laser beam based wireless network, such as the second communication network 120.

In accordance with an embodiment, after the coarse alignment, a fine alignment may be executed at each optical node. Based on the orientation and tilt sensor data, the master communication device 102 or the cloud server 116 may be further configured to perform the fine alignment at each optical node to align a laser beam transmission path at each optical node. The fine alignment may be performed by use of one or more beacon lasers (e.g., a pencil laser beam in the visible light spectrum), one or more image-capture devices, such as the image-capture device 110, and a motorized altazimuth.

In an implementation, the master communication device 102 may be configured to direct a pencil laser beam in a visible light spectrum to the optical routing device 104A in the defined indoor area 112 to align an optical path. The optical routing device 104A may then deflect the pencil laser beam to other optical routing devices 104B, 104C, . . . , 104N, in the defined indoor area 112, to make them optically aligned to the laser beam transmission path. Similarly, each service communication device may be aligned accordingly. The optical alignment may be controlled by the master communication device 102 or the cloud server 116. At each optical node, transmitted laser power may be monitored as well as the optical receiver RSSI. If laser power has not degraded but the optical receiver RSSI indicates a drop in power, then an automatic optical alignment routine may be executed. The optical receiver RSSI and transmit laser power may be monitored and reported back to the master communication device 102 or the cloud server 116 (hosting network management software) via a radio frequency (RF) wireless connectivity. Additionally, visible color LED's may be provided on each optical node to indicate a connection status. For example, when a laser beam link is operating properly, the LED may be green at such particular node. When power is below a defined level, the indicator may turn orange and when the laser link is interrupted, it may turn red. Further, when the communication system 100 may be executing an alignment procedure, the LED indicator may keep flashing.

In an implementation, the one or more sensors 122 at each optical node may also be equipped with a geospatial sensor (e.g., a GPS sensor) for the localization of the optical nodes. For identifying the locations of the optical nodes in GPS-denied environments, when GPS accuracy is insufficient, and for optimization of the laser beam, optical nodes may perform range measurement. The range measurements may provide the distance between two optical nodes (i.e., specifically, the laser receiver and laser transmitter) independent of the GPS sensor. The range measurements may be done by pulse or AC modulating the beacon laser and using time of flight measurements at the laser receiver using a common clock. The range measurement in combination with tunable lenses (in which focal length may be adjusted mechanically or electrically) may permit fine adjustments to the beam divergence for optimum data signal transmission across the laser beam based wireless network, such as the second communication network 120.

Figure 3A:
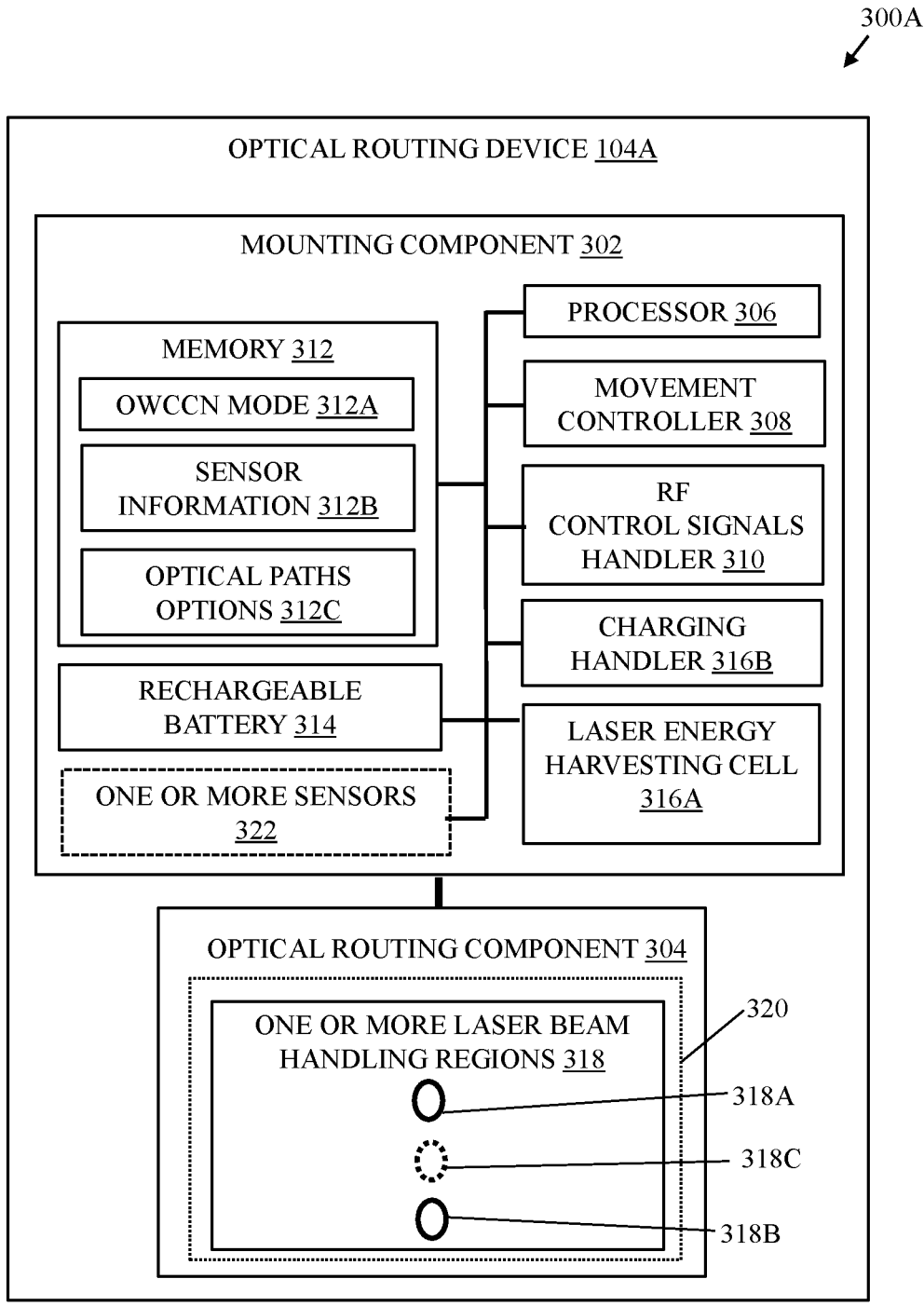
FIG. 3A is a block diagram that illustrates various components of an optical routing device of a communication system, in accordance with an exemplary embodiment of the disclosure.
Figure 3B:
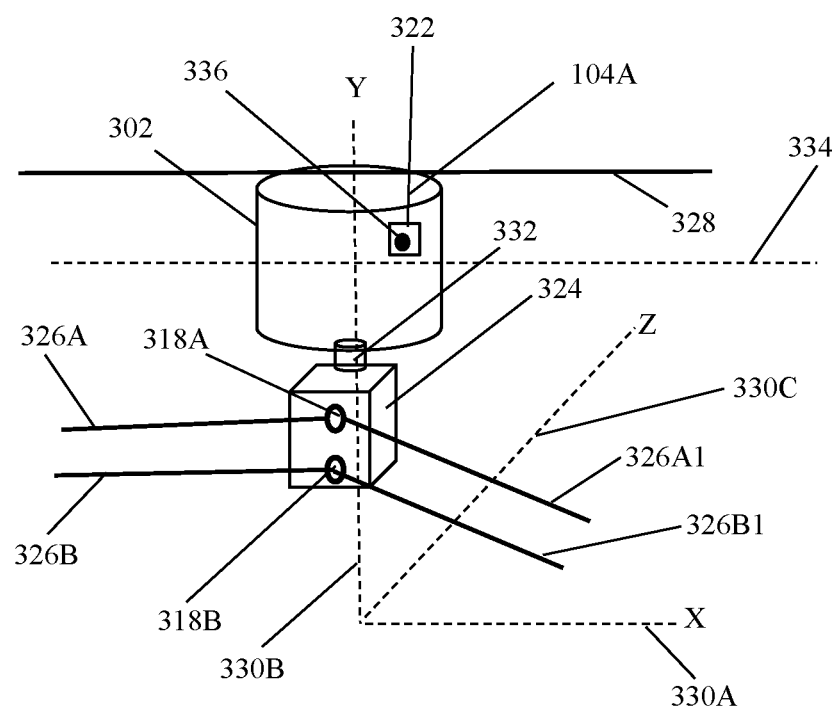
FIG. 3B is a diagram illustrating an exemplary optical routing device of a communication system, in accordance with another exemplary embodiment of the disclosure.
Figure 3C:
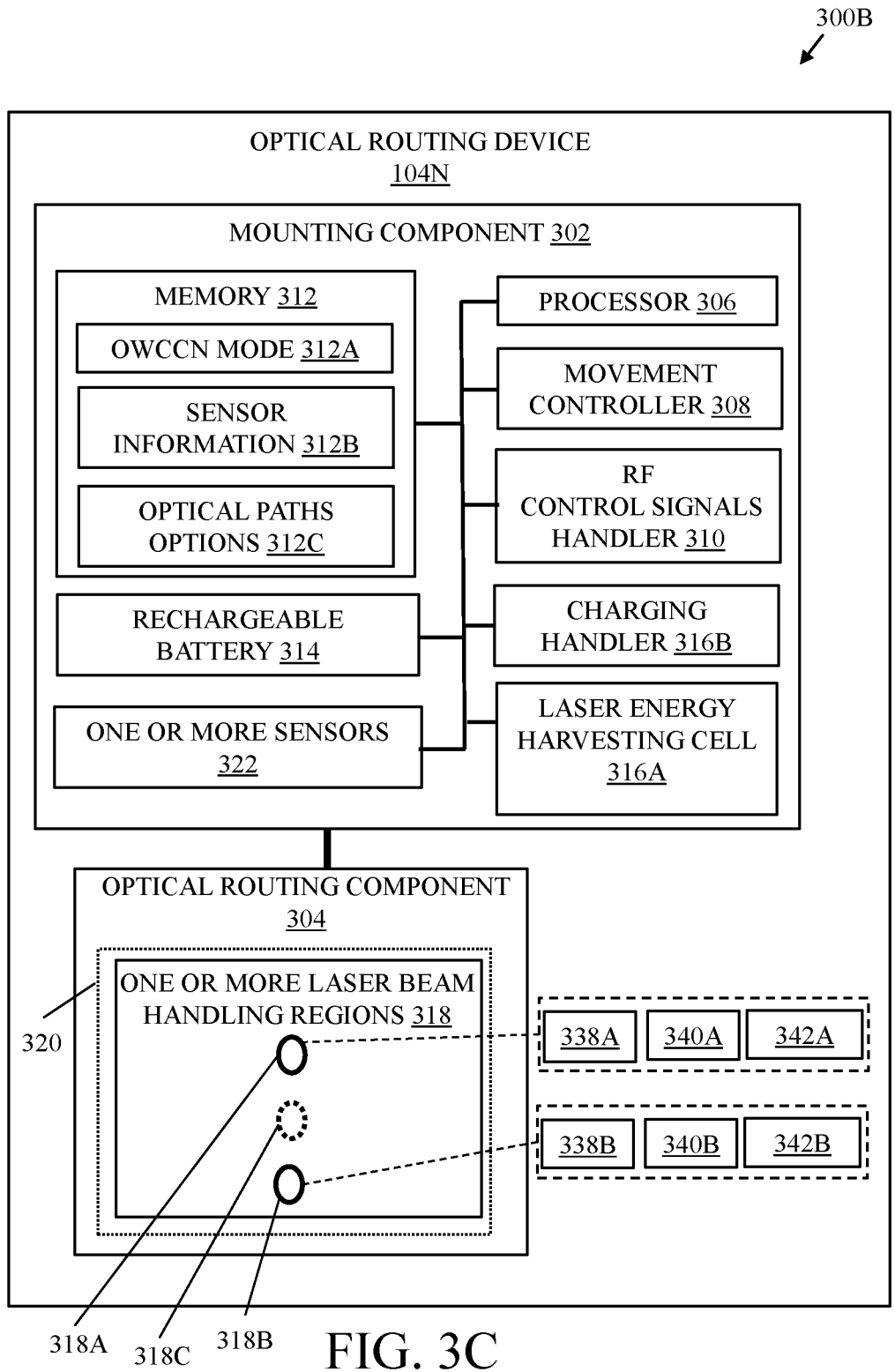
FIG. 3C is a block diagram illustrating various components of an exemplary optical routing device of a communication system, in accordance with yet another exemplary embodiment of the disclosure.

Different embodiments and operations of optical routing devices of the plurality of optical routing devices 104 are described in detail, for example, in FIGS. 3A, 3B, and 3C. Advantageously, each of the plurality of optical routing devices 104 smarty employs one or more radio frequency (RF) supervisory links to communicate with the master communication device 102 or one or more service communication devices 106 for monitoring and control purpose while employs a laser beam deflection capability for actual laser beam based wireless communication in a multigigabit data rate to form a laser beam based wireless network, such as the second communication network 120, in the defined indoor area 112. Each of the plurality of optical routing devices 104 ensures an ultra-flexible and ultra-reliable laser beam based wireless communication with significantly lower power consumption, which can be powered even by an inbuilt battery. The disclosed optical routing device, such as the optical routing device 10A, creates a smart laser-based wireless network in the defined indoor area 112 that ensures full coverage with high signal-to-noise (SNR) in different physical spaces including all nooks and corners of the defined indoor area 112 with high-speed data connectivity to the plurality of end-user devices 108 without the need to deploy costly conventional intermediate routers. The alignment of the master communication device 102 with the one or more service communication device 106 may be done utilizing the plurality of optical routing devices 104 by use of a Z-fold arrangement of mirrors or alignment techniques, shown and discussed in detail, for example, in FIGS. 6A and 6B.

Figure 2:
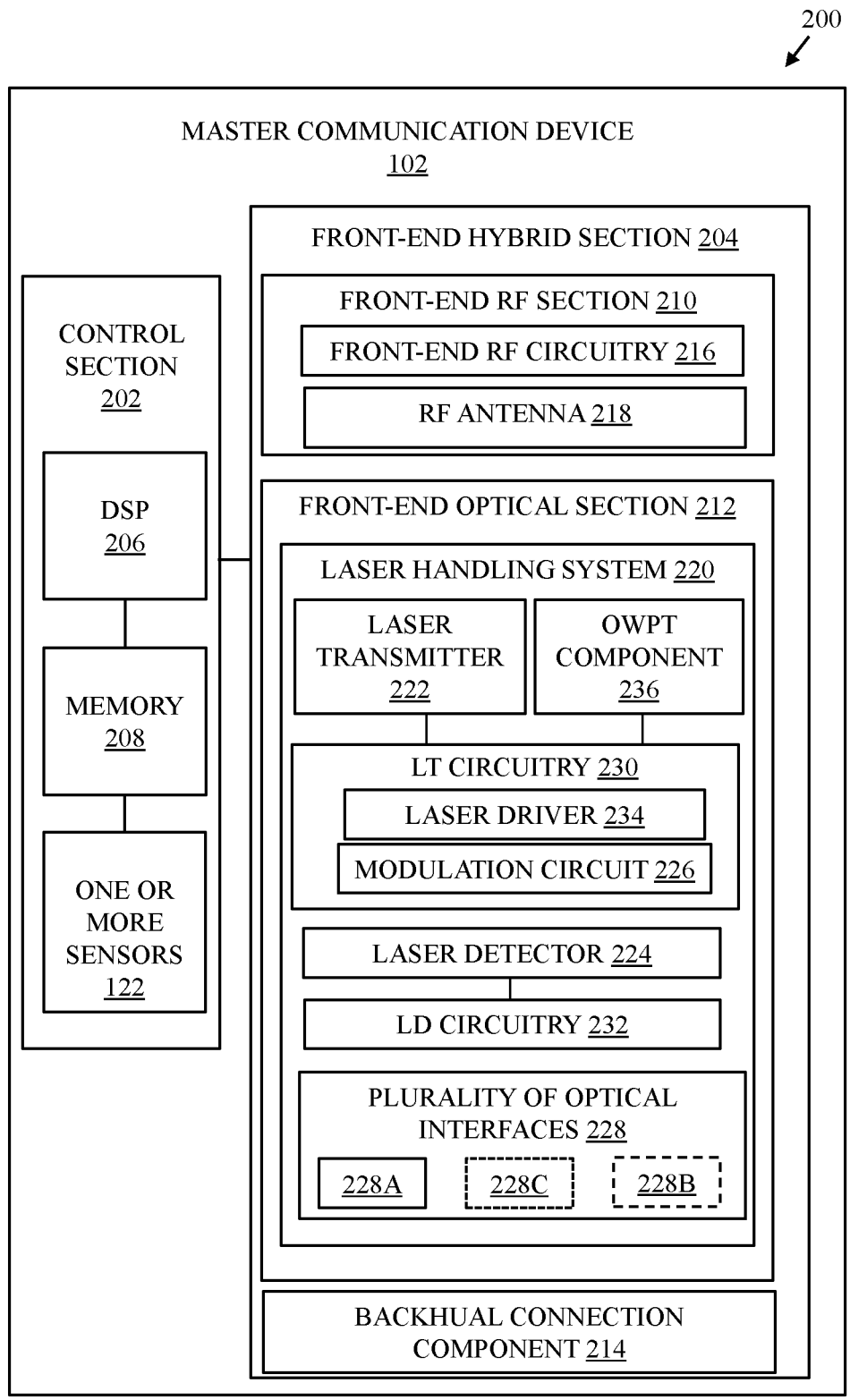
FIG. 2 is a block diagram that illustrates various components of an exemplary master communication device of a communication system, in accordance with an exemplary embodiment of the disclosure.

FIG. 2 is a block diagram illustrating various components of an exemplary master communication device of a communication system, in accordance with an exemplary embodiment of the disclosure. FIG. 2 is explained in conjunction with elements from FIG. 1. With reference to FIG. 2, there is shown a block diagram 200 of the master communication device 102. The master communication device 102 may include a control section 202 and a front-end hybrid section 204. The control section 202 may include a digital signal processor 206 (i.e., a DSP 206) and a memory 208. The control section 202 may be communicatively coupled to the front-end hybrid section 204. The front-end hybrid section 204 may include a front-end radio frequency (RF) section 210, a front-end optical section 212, and a backhaul connection component 214. The front-end RF section 210 may include front-end RF circuitry 216 and a RF antenna 218. The front-end optical section 212 may include a laser handling system 220, which includes a laser transmitter 222, a laser detector 224, a modulation circuit 226, and a plurality of optical interfaces 228.

The laser handling system 220 may further include a laser transmission (LT) circuitry 230 and a laser detector (LD) circuitry 232. The LT circuitry 230 may include free-space laser transmitter electronics, such as a laser driver 234, the modulation circuit 226, and in some exemplary implementations, additionally one or more beam-shaping optics (not shown). The LD circuitry 232 may include free-space laser detector electronics, such as a transimpedance amplifier (TIA) for converting the current signal from the laser detector 224 to a voltage signal, a limiting amplifier for amplifying and cleaning the signal, and a Clock and Data Recovery (CDR) component for recovering clock and data signals from the incoming signal. Additionally, in some implementation, the LD circuitry 232 may further include other components, such as a pre-amplifier, a post-amplifier, and an equalizer in conjunction with the TIA, limiting amplifier, and the CDR to increase overall performance of the communication system 100 depending on the use case. There is further shown an optical wireless power transmission (OWPT) component 236 in the laser handling system 220, for the purpose of remote delivery of power to the plurality of optical routing devices 104 and the one or more service communication devices 106.

The DSP 206 include suitable logic, circuitry, and/or interfaces configured to control the laser handling system 220. In an implementation, the DSP 206 may be further configured to control the front-end RF circuitry 216. The master communication device 102 may be a programmable device, where the DSP 206 may execute instructions stored in the memory 208. Example of the implementation of the DSP 206 may include, but are not limited to an embedded processor, a field-programmable gate array (FPGA), a microcontroller, a specialized DSP, an Application-Specific Integrated Circuit (ASIC) processor, and/or other processors.

The memory 208 may include suitable logic, circuitry, and/or interfaces that may be configured to store instructions executable by the DSP 206. Examples of implementation of the memory 208 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. It is to be understood by a person having ordinary skill in the art that the control section 202 may further include one or more other components, such as an analog to digital converter (ADC), a digital to analog (DAC) converter, a cellular modem, and the like, known in the art, which are omitted for brevity.

The front-end RF section 210 may include the front-end RF circuitry 216 and the RF antenna 218. The front-end RF circuitry 216 may include RF receiver circuitry and RF transmitter circuitry for Wi-Fi® communication, for example, in 2.4 GHz, 5 GHz, 6 GHz, or 7 GHz. In an example, the receiver circuitry may include a cascading receiver chain comprising various components (e.g., the RF antenna 218, a set of low noise amplifiers (LNA), a set of receiver front end phase shifters, and a set of power combiners) for the signal reception (not shown for brevity). Thus, the master communication device 102 may be a modified wireless access point (WAP) where at least one RF antenna is retained to communicate control signals to the plurality of optical routing devices 104 and the one or more service communication devices 106 to maintain service continuity in the laser beam based wireless communication network and where the front-end optical section 212 is connected at the other end to facilitate communication with different network nodes, such as the plurality of optical routing devices 104, via laser beams. The RF antenna 218 may be an RF antenna of the modified WAP.

The laser handling system 220 may include the laser transmitter 222, the laser detector 224, the modulation circuit 226, and the plurality of optical interfaces 228. The laser transmitter 222 may be configured to direct a first laser beam carrying the first data signal over the air in a downstream path to a service communication device, such as the service communication device 106A, directly or via the plurality of optical routing devices 104 based on the plurality of defined connectivity criterions. The laser transmitter 222 may be configured to focus the first laser beam into a narrow, collimated beam. The laser detector 224 may be configured to detect a second laser beam carrying one or more second data signals from the plurality of end-user devices 108 via the plurality of optical routing devices 104. The laser detector 224 detects the photons of light that are emitted by the second laser beam and converts them into an electrical signal that can be analyzed and data can be extracted from such electrical signal. The modulation circuit 226 may be configured to modulate the intensity and/or any one of: a phase, frequency, or a polarization of the first laser beam (generated by the laser transmitter 222) in accordance with the data to be transmitted. In an implementation, the laser transmitter 222 may include a laser diode that may be used to generate the first laser beam in which the first data signal may be modulated by the modulation circuit 226.

Beneficially, the plurality of optical interfaces 228 are special purpose physical interfaces to handle a plurality of laser beams concurrently segregating download and upload functions via a plurality of distinct laser beams. There may be three scenarios for implementation of the plurality of optical interfaces 228. In a first implementation, there may be one bi-directional optical interface 228A to direct one laser beam for both downstream (Tx) and upstream communication (Rx) by wavelength division multiplexing (WDM). As an example, 1490 nm wavelength can be used for transmitting and 1550 nm for receiving. The task of beam combining and separating can be done with a dichroic mirror. In the second implementation, there may be two optical interfaces with one optical interface 228A to direct one laser beam for downstream (Tx) and another optical interface 228B for upstream communication (Rx). In a third implementation, there may be three optical interfaces 228A and 228B, where one optical interface 228A is used to direct a bi-directional laser beam for laser-based wireless communication in a non-visible, near infrared light spectrum to form a wireless optical backhaul, and another optical interface 228B is used to direct a beacon laser beam in the visible spectrum for the purpose of optical alignment, and the other optical interface 228C is used for power transmission to downstream optical nodes, such as one or more optical routing devices of the plurality of optical routing devices 104 and/or the one or more service communication devices 106. The DSP 206 may be further configured to control emission of a third laser beam (e.g., may also be referred to as a beacon laser beam or a power laser) via the optical interface 228C over-the-air for an optical wireless power transmission to remotely charge the rechargeable battery 314 (FIGS. 3A and 3C) of each of the plurality of optical routing devices 104 (e.g., passive optical deflectors or passive free-space optical routers for free-space communication (Not optical fiber routers)). For example, when the third laser beam strikes one of the plurality of optical routing devices 104, the third laser beam may be deflected further to other optical routing devices causing each rechargeable battery of each of the plurality of optical routing devices 104 to be charged wirelessly via an optical medium. In an implementation, the optical interface 228C may be placed in the middle of the other two optical interfaces 228A and 228B. In another implementation, the optical interface 228C may be positioned nearest the mounting surface (e.g., the ceiling surface) in the order optical interface 228C followed by optical interfaces 228A and 228B in a vertical alignment or a horizontal alignment or at other positions without limiting the scope of the disclosure.

The backhaul connection component 214 may include ports to connect to wired mediums, such as a coaxial cable, a fiber optic cable and the like, to receive input, for backhaul connectivity, for example, to Internet (i.e., the first communication network 118), and provide output to the laser handling system 220. The backhaul connection component 214 may be configured to convert the first data signal received as the optical signal or the RF signal to an electrical signal and pass data in the form of the electrical signal to the laser handling system 220 where it is modulated to a laser beam, such as the first laser beam, for over-the-air laser beam based wireless communication.

The LT circuitry 230 may include the laser driver 234, the modulation circuit 226, or one or more beam shaping optical components. The laser driver 234 may be configured to provide the electrical current needed to operate the laser transmitter 222, such as a directly modulated laser diode (DML) or an externally modulated laser diode (EML). The laser driver 234 may be used to operate the laser transmitter 222 to direct a laser beam over-the-air within its specified current range, providing stable and reliable operation. The laser driver 234 drives the laser diode by converting a low-voltage, low-current signal into a high-voltage, high-current signal that can drive the laser diode. The one or more beam shaping optical components may be used to shape the transmitted laser beam to match the requirements of the communication system 100, for example, by collimating the laser beam, expanding, focusing the laser beam, or adjusting the laser beam's divergence angle so that the laser beam is properly coupled into an optical communication channel and propagates with optimum spreading. The beam shaping optics may use a Keplerian design or preferably a Galilean design for compactness.

The LD circuitry 232 may be configured to detect and process the signals received from the laser detector 224 to achieve free-space optical communication. In an implementation, the LD circuitry 232 may employ laser detector electronics known in the art. The sub-components of the LD circuitry 232 are not shown for the sake of brevity. For example, the LD circuitry 232 may include the TIA, the limiting amplifier, and the CDR component for detecting and processing the signals received from the laser detector 224. In an implementation, for example, the TIA may be used convert a current signal generated by the laser detector 224 into a voltage signal. The TIA may amplify the current signal by converting it into a voltage signal. The TIA may further provide a low-impedance output that can be easily connected to other components. The TIA may be a part of front-end amplifier that may be employed to boost the signal to a level that can be detected by the limiting amplifier. The limiting amplifier may then be used to amplify the voltage signal produced by the TIA and to remove any noise or distortion in the signal. The limiting amplifier may have a threshold that sets the upper and lower limits of the input signal. When the input signal is below the lower threshold, the limiting amplifier output is zero, and when the input signal is above the upper threshold, the limiting amplifier output is at its maximum level. The limiting amplifier may be employed to ensure that the signal is clean and that it is not distorted by any noise. The CDR component may be used to recover the clock signal and the data signal from the incoming signal. The clock signal may be used to synchronize the laser detector 224 with the laser transmitter from where a laser beam with the first data signal is received receiver. In other words, to synchronize the receiver with the transmitter, while the data signal carries the actual information. The CDR component may be configured to utilize a phase-locked loop (PLL) to extract the clock signal from the incoming signal and to generate a local clock signal that is synchronized with the transmitter (e.g., the laser transmitter 420 of the service communication device 106A). The data signal may then be extracted by sampling the input signal at the correct time relative to the recovered clock signal. The CDR component may be employed to ensure that the receiver (e.g., the laser detector 224) is synchronized with the transmitter (e.g., (e.g., the laser transmitter 420 of the service communication device 106A) and that the data is correctly decoded.

Additionally, in some implementation, the LD circuitry 232 may further include other components, such as a pre-amplifier, a post-amplifier, and equalizer in conjunction with the TIA, limiting amplifier, and the CDR to increase overall performance of the communication system 100. For instance, in a case where the received signal is weak, and a stronger signal is needed to drive the TIA, the pre-amplifier may be used to amplify weak signals received by the laser detector 224 before it is passed to the TIA. In a case where the gain of the signal needs to be adjusted to match the requirements of the downstream components, the post-amplifier may be used to amplify the signal after it has passed through the limiting amplifier. Similarly, the equalizer may be used to compensate for any distortion, if any introduced in the communication system 100.

The OWPT component 236 may be configured to direct a third laser beam (e.g., may also be referred to as a beacon laser beam or power laser) via the optical interface 228C over-the-air for an optical wireless power transmission to remotely charge the rechargeable battery 314 (FIGS. 3A and 3C) of the optical routing device 104A and further other the optical routing devices of the plurality of optical routing devices 104. For example, when the third laser beam (may also be referred to as a power laser or a beacon laser beam) strikes one of the plurality of optical routing devices 104, the third laser beam may be deflected further to other optical routing devices causing each rechargeable battery of each of the plurality of optical routing devices 104 to be charged wirelessly. Alternatively, in some implementations, a third laser beam via the optical interface 228C may only be used for optical wireless power transmission over-the-air to remotely charge the rechargeable battery 314 (FIGS. 3A and 3C) of the optical routing device 104 and may not be used for alignment. A separate beacon laser beam in visible light may be used for alignment purpose via another optical interface, such as the optical interface 228B in an example. In an implementation, the OWPT component 236 may be further configured to remotely charge the rechargeable battery 440 (FIG. 4) of the service communication device 106A and/or other service communication devices. In an implementation, the OWPT component 236 may be operably connected to the LT circuitry 230 and may have its own laser diode distinct from the laser transmitter 222 to function concurrently when in operation. In another implementation, the OWPT component 236 may be a transceiver (e.g., metal halide perovskite photovoltaic cell) that may be employed for both absorbing light from and emitting light (i.e., the third laser beam) to other OWPT systems equipped with similar transceivers, and an additional laser diode may not be required. The OWPT component 236 may be further configured to transmit the third laser beam (e.g., the power laser or the beacon laser beam) in a wavelength to match a spectral response of the laser energy harvesting cell 316A of the optical routing device 104A. The third laser beam (e.g., the power laser or the beacon laser beam) may be emitted in a defined power density to generate enough electricity (e.g., in milliwatts or even watts) to charge the rechargeable battery of other optical nodes, such as each of the plurality of optical routing devices 104 or the service communication device 106A.

FIG. 3A is a block diagram illustrating various components of an exemplary optical routing device of a communication system, in accordance with an exemplary embodiment of the disclosure. FIG. 3A is explained in conjunction with elements from FIG. 1 and FIG. 2. With reference to FIG. 3A, there is shown a block diagram 300A of the optical routing device 104A. The optical routing device 104A may be similar to that of other optical routing devices, such as the plurality of optical routing devices 104. Each of the plurality of optical routing devices 104 may be a light weight and a low power optical node with a small form factor. In an example, the dimensions of each of the plurality of optical routing devices 104 may range from 2 cm to 30 cm (width or length). In certain scenarios, the length may be extended using a length extender to maintain an alignment to send or receive a laser beam.

The optical routing device 104A may include a mounting component 302 and an optical routing component 304 attached to the mounting component 302. The mounting component 302 may be made of a variety of materials, including metal, mirror, or plastic, and may be sturdy and precise in order to accurately position the optical routing component 304. The mounting component 302 may hold the optical routing component 304 and allows it to be positioned and oriented in one or more angles to deflect one or more laser beams in one or more specific directions and angles. In some cases, the optical routing component 304 may further include a free-space optical beam splitter (shown in FIG. 3C in an example) or a free-space optical beam combiner (shown in FIG. 3C in an example) depending on the application scenario. The mounting component 302 may be mounted on a ceiling surface or a wall surface of the defined indoor area 112. In an example, mounting component 302 may be an electromechanical turret (also referred to as "eyeball"), or other mounting structure that is movable in 360 degrees around an axis (e.g., Y axis, and at least 30 degrees up and down with respect to an imaginary reference surface, running parallel to a ceiling surface in the defined indoor area 112). In another example, a small stepper motor driven mechanism may be used in the mounting component 302 to pan and tilt the optical routing device 104A. In another example, a small stepper motor driven mechanism may be provided in the mounting component 302 as a part of the movement controller 308 to pan and tilt the optical routing device 104A.

The mounting component 302 may comprise a rechargeable battery 314 to power operations of the optical routing device 104A. Beneficially, the optical routing device 104A is developed to operate without the use of any external power supply from a power source (e.g., an alternating current power source), which in turn facilitates easy deployment of the optical routing device 104A. Moreover, the way the rechargeable battery 314 is intelligently charged using the same laser beam that is employed to carry a data signal in the laser beam based wireless communication network (i.e., the second communication network 120). This ensures flexibility in deployment as well as increases the reliability in operations of the optical routing device 104A. The optical routing device 104A may further include a laser energy harvesting cell 316A and a charging handler 316B.

The mounting component 302 may further comprise the processor 306 configured to communicate over-the-air with the master communication device 102 or one or more service communication devices 106 via one or more radio frequency (RF) supervisory links. In an example, the processor 306 may be implemented as low-power control circuit, which may be powered ON only when needed to save power. Other examples of the processor 306, may include but are not limited to a control circuitry, a microcontroller, a microprocessor, a state machine, a hardware processor, and or other control circuits. In a case where the optical routing device 104A is a primary optical deflector node, the processor 306 may be configured to establish an RF supervisory link with the master communication device 102. In a case where the optical routing device 104A is a secondary optical deflector node, the processor 306 may be configured to establish one or more RF supervisory links with one or more other optical routing devices of the plurality of optical routing devices 104 and/or one or more service communication devices 106. The primary optical deflector node refers to any optical routing device that in a line-of-sight of the master communication device 102 and/or a nearest optical node that is able to send and receive laser beam from the master communication device 102. Each secondary optical deflector node refers to an optical routing device that is in a non-line-of-sight (NLOS) to the master communication device 102 and/or not directly able to send and receive laser beam from the master communication device 102. The processor 306 may be configured to communicate with the master communication device 102 or one or more service communication devices 106 by use of the RF control signal handler 310. For example, in an implementation, the RF control signal handler 310 may be configured to communicate control signals under the control of the processor 306 over existing Wi-Fi© signals in 2.4 GHz or 5-7 GHz frequency with the master communication device 102 to receive instructions in real time or near real time to change an angle or a direction of deflection of a laser beam in order to switch and align the laser beam to a different destination, such as a new optical routing device from among the plurality of optical routing devices 104. In another implementation, the plurality of optical routing devices 104 may be controlled and networked via a built-in BLUETOOTH™ link. In other words, RF supervisory links may be Bluetooth links or Wi-Fi® links.

The processor 306 may be further configured to receive an instruction via the one or more RF supervisory links to control a movement of the mounting component 302 along with the optical routing component 304 such that an angle or a direction of deflection or routing of one or more laser beams from the optical routing component 304 is changed. In an example, the processor 306 may be configured to direct the movement controller 308 to move the mounting component 302 along with the optical routing component 304. The movement controller 308 enables the optical routing component 304 to be positioned and oriented in one or more angles to reflect a laser beam in one or more specific directions and angles. In an example, the movement controller 308 may include a servo motor, a stepper motor, or an actuator.

The optical routing component 304 may comprise one or more laser beam handling regions 318 configured to handle a plurality of laser beams concurrently in which a first laser beam is deflected via a first region 318A of the one or more laser beam handling regions 318 for downstream data communication in a downstream path and a second laser beam is deflected via a second region 818B of the one or more laser beam handling regions 318 for upstream data communication in an upstream path. In an example, the one or more laser beam handling regions 318 may be two distinct deflection interfaces or laser beam handling interfaces provided on a deflecting surface 320 configured to deflect two laser beams concurrently, where one laser beam may be directed towards the downstream path and the other laser beam may be directed towards the upstream path. In accordance with an embodiment, the downstream path corresponds to communication from the master communication device towards the one or more service communication devices via at least the optical routing device 104A. The upstream path corresponds to communication from one or more end-user devices to the one or more service communication devices and further to the master communication device via at least the optical routing device 104A. Each of the one or more laser beam handling regions 318 may comprise a mirror or a mirror-like surface to deflect a corresponding laser beam. Each of the one or more laser beam handling regions 318 may include a mirror or a mirror-like surface to deflect one laser beam. For example, the mirror-like surface may be made from a variety of materials and coatings, such as aluminum, or silver, and polished and coated in order to achieve the highest possible reflectivity. In another example, each of the one or more laser beam handling regions 318 may include a free-space beam splitter or combiner, or a free-space wavelength splitter or combiner. In yet another implementation, one of the the one or more laser beam handling regions 318 may be used for deflecting or routing a single laser beam for Tx and Rx (i.e., for bi-directional communication) but at two different wavelengths using wavelength division multiplexing (WDM). The wavelength splitting and combining may be performed passively using a dichroic mirror.

In accordance with an embodiment, the first laser beam may carry a first data signal from the master communication device 102. The second laser beam may carry one or more second data signals from the one or more service communication devices 106. The one or more second data signals correspond to user data associated with a plurality of end-user devices 108.

In accordance with an embodiment, the optical routing device 104A may use multiple optical wavelengths in deflected beams to send and receive data. For example, similar to a gigabit passive optical network (GPON), the processor 306 may be further configured to use separate wavelengths for the first laser beam at the 1550 nm and the second laser beam at 1300 nm bands for transmit and receive respectively. Additional wavelength channels (i.e., communication data lanes) in each band may offer a path to increasing the data rate. For example, coarse wavelength division multiplexing (CWDM) may allow up to 18 channels and dense wavelength division multiplexing (DWDM) may allow up to 200 channels.

In accordance with an embodiment, the processor 306 may be further configured to activate an Optical Wireless Charging-Cum-Networking (OWCCN) mode in which at least one of the one or more laser beam handling regions 318 is configured to deflect a laser beam to form a laser beam-based wireless communication network and concomitantly cause the same laser beam to charge the rechargeable battery 314 via the at least one of the one or more laser beam handling regions 318. The OWCCN mode is a new mode which when activated not only uses the same laser beam (e.g., the first or the second laser beam) to communicate data in the Laser Beam Mesh Network (LBMN) or the Laser Beam Cascaded Network (LBCN) in the defined indoor area 112 but also charge the rechargeable battery 314 using the same laser beam. An example of the Laser Beam Cascaded Network (LBCN) is shown and described, for example, in FIG. 6A. An example of the Laser Beam Mesh Network (LBMN) is shown and described, for example, in FIG. 6B.

In an exemplary scenario, the master communication device 102 may be further configured to direct the first laser beam carrying the first data signal in the downstream path to a service communication device, such as the service communication device 106A, via the plurality of optical routing devices 104. The service communication device 106A may be further configured to obtain one or more second data signals from the plurality of end-user devices 108 and re-transmit the obtained one or more signals over the second laser beam in the upstream path to the master communication device 102 via the plurality of optical routing devices 104. In such exemplary scenario, depending on the data traffic in the upstream path or the downstream path, one of the one or more laser beam handling regions 318 may be selected to not only deflect the laser beam to form the laser beam-based wireless communication network but also cause the same laser beam to charge the rechargeable battery 314 via the selected one of the one or more laser beam handling regions 318. For example, the second region 318B of the one or more laser beam handling regions 318 may be selected if data traffic in the downstream path is less than the upstream path if the second region 318B is used for the downstream data communication in the downstream path.

In another example, the selection of the laser beam handling region from the one or more laser beam handling regions 318 for charging may be pre-defined and not dynamic. In such a case, an electrical connection with such laser beam handling region is pre-defined and fixed with the charging handler 316B. When the laser beam strikes such laser beam handling region (e.g., a deflection region), such as the second region 318B, the laser energy harvesting cell 316A (e.g., a photovoltaic cell) associated with the charging handler 316B may absorbs the light energy and converts it into electrical energy, which is then stored in the rechargeable battery 314.

In yet another example, the selection of the beam handling region from the one or more laser beam handling regions 318 for charging may be dynamic. It is understood that delivering high power to the laser energy harvesting cell 316A can quickly increase their temperature up to 120 or 150 degree Celsius at which point they can only remain operational for a few seconds. Advantageously, when the OWCCN mode is set and activated, the processor 306 may be further configured to intermittently enable and disable a connection of the selected beam handling region from the one or more laser beam handling regions 318 to the rechargeable battery 314. Specifically, the connection with the laser energy harvesting cell 316A by the charging handler 316B may be intermittently disabled to prevent a rise of temperature at the laser energy harvesting cell 316A beyond a defined threshold limit. This enables to avoid the use of any bulky heat sink for heat dissipation and maintain the small form factor of the optical routing device 104A. In another example, alternatively, if the Status-of-charge (SoC) of the rechargeable battery 314 is below a set SoC, then it may be required to continually charge the the rechargeable battery 314. In such a case, the processor 306 may be further configured to switch the connection to the rechargeable battery 314 from the one or more laser beam handling regions 318. In other words, the connection of the first region 318A to the rechargeable battery 314 via a first laser energy harvesting cell, such as the laser energy harvesting cell 316A, may be disabled by the charging handler 316B, whereas the connection of the second region 318B to the rechargeable battery 314 via a second laser energy harvesting cell may be enabled by the charging handler 316B and vice-versa periodically.

In an implementation, the mounting component 302 may include a memory 312. The memory may be configured to store instructions related to activation or deactivation of the OWCCN mode 312A. The memory 312 may further store sensor information 312B acquired from the one or more sensors 322 and optical path options 312C. The optical path options 312C may be different fall-back laser-link options available to a given optical routing device to establish a laser beam connectivity. The fall-back laser-link options for each optical routing device may include location coordinates of each optical routing device and corresponding two or more neighbouring optical routing devices and laser beam alignment information, such as an angle of deflection of a laser beam, a direction of deflection of the laser beam, a beam width of the laser beam, and a laser intensity to be set for the laser beam, between two optical routing devices. The fall-back laser-link options for each of the plurality of optical routing devices 104 may be used to generate the plurality of different laser-communication route options. There may be different optical path options 312C for upstream path and the downstream path. In an example, the optical path options 312C may be historical data of previous connections done by each of the plurality of optical routing devices 104 after installation to their corresponding locations in the defined indoor area 112. In another example, the optical path options 312C may be proactively determine options to establish laser beam-based connections by each of the plurality of optical routing devices 104. Alternatively, and additionally, the optical path options 312C may be acquired from the cloud server 116.

FIG. 3B is a diagram illustrating an exemplary optical routing device of a communication system, in accordance with an exemplary embodiment of the disclosure. FIG. 3B is explained in conjunction with elements from FIGS. 1, 2, and 3A. With reference to FIG. 3B, there is shown the optical routing device 104A.

In an implementation, the master communication device 102 (FIG. 1) may be further configured to transmit the first laser beam 326A in a wavelength to match a spectral response of the laser energy harvesting cell 316A (e.g., photovoltaic cells) in the charging handler 316B of the optical routing device 104A. In an example, the master communication device 102 may be further configured to transmit the first laser beam 326A in a defined power density to generate enough electricity (e.g., in milliwatts or even watts) to charge the rechargeable battery 314. The movement of the mounting component 302 with respect to the optical routing component 304 may be achieved using a movable attachment element 332 that movably connects the mounting component 302 with the optical routing component 304. The movable attachment element 332 may be a ball shaped movable element, an oval shaped movable element, a pipe-shaped movable element, or a combination thereof.

In accordance with an embodiment, the control of the movement of the mounting component 302 along with the optical routing component 304 may comprise controlling a pitch rotation of the mounting component 302 along an x-axis 330A that is parallel to a mounting surface 328 of the optical routing device 104A. The control of the movement may be in response to the instruction received from the master communication device 102 or the cloud server 116 via the one or more RF supervisory links. The mounting component 302 along with the optical routing component 304 may be rotated along the x-axis 330A. The control of the movement of the mounting component 302 along with the optical routing component 304 may further comprise controlling a yaw rotation of the mounting component 302 along a y-axis 330B orthogonal to the x-axis 330A. The control of the movement of the mounting component 302 along with the optical routing component 304 may further comprise causing an alignment of an optical path among the master communication device 102 one or more other optical routing devices, and the one or more service communication devices 106, based on the controlling of the pitch rotation or the yaw rotation of the mounting component 302.

In accordance with an embodiment, the control of the movement of the mounting component 302 along with the optical routing component 304 further comprises controlling a roll rotation of the mounting component 302 along a z-axis 330C, where causing the alignment of the optical path among the master communication device 102, one or more other optical routing devices, and the one or more service communication devices 106, may be further based on the controlling of the roll rotation in addition to the pitch rotation or the yaw rotation of the mounting component 302. Further, the control of the movement of the mounting component 302 along with the optical routing component 304 further comprises aligning a transmit polarization of the one or more laser beams deflected by the optical routing component 304 in accordance with a destination device when an optical polarization multiplexing is utilized in data communication over a laser beam-based wireless communication network. The optical polarization multiplexing is used to transmit multiple data streams over a single laser beam by encoding the data onto different polarization states of light. The transmit polarization of the one or more laser beams deflected by the optical routing component 304 may be aligned by adjusting the orientation of the optical routing component 304 so that it deflects light with a specific polarization state in the transmission path, for example, the upstream path or the downstream path. The polarization of laser emission refers to the direction of the electric field oscillation of a given laser beam. The destination device may be one of the master communication device 102, one or more other optical routing devices, or the one or more service communication devices 106.

In accordance with an embodiment, the mounting component 302 may further comprise one or more sensors 322 (such as an accelerometer, an electronic compass, a gyroscope, a magnetometer, a geospatial positioning sensor, and the like) to measure an orientation and a level of the optical routing component 304 with respect to a reference surface 334 to maintain an alignment of an optical path with one or more of the master communication device 102, one or more other optical routing devices, and the one or more service communication devices 106. The one or more sensors 322 correspond to the one or more sensors 122 of FIG. 1. The reference surface 334 may be an imaginary reference surface running parallel to a ceiling surface, such as the mounting surface 328, in the defined indoor area 112. The level corresponds to a distance from the reference surface 334. The processor 306 may be further configured to communicate the measured orientation, the level, and location data of the optical routing device 104A over the one or more RF supervisory links to the master communication device 102 or the cloud server 116.

In accordance with an embodiment, the optical routing device 104A may further comprise a temperature sensor 336. The processor 306 may be further configured to determine a thermomechanical-induced change in an alignment of an optical path of the optical routing device 104A with one or more of the master communication device 102, one or more other optical routing devices, and the one or more service communication devices 106. The processor 306 may be further configured to execute an automatic alignment of the optical path when a temperature monitored by the temperature sensor 336 is outside a pre-set range. The automatic alignment may use a look up table containing the correction to be made by a motor (e.g., a stepper motor) at different temperatures. Such a look up table may be pre-defined and generated during calibration at the time of manufacturing (e.g., in a factory). Alternatively, in another example, such look up table may be generated dynamically or updated remotely by the cloud server 116.

In accordance with an embodiment, the processor 306 may be further configured to receive a Laser Beam Network Control (LBNC) instructions from the master communication device 102 or the cloud server 116. The processor 306 may be further configured to dynamically adjust an orientation of the one or more laser beam handling regions 318 in the deflecting surface 320 of the optical routing component 304, based on the LBNC instructions received from the master communication device 102 or the cloud server 116. The instruction to control the movement of the mounting component 302 may be received from the master communication device 102 or the cloud server 116 via the one or more RF supervisory links. The processor 306 may be further configured to switch and re-align the one or more deflected laser beams 326A1 and 326B1 in a real-time or a near real-time to a different destination device based on a change in the angle or the direction of deflection or pointing of the one or more laser beams from the optical routing component 304. For example, the one or more deflected laser beams 326A1 and 326B1 may be deflected to a new optical routing device from among the plurality of optical routing devices 104 or a new service device of the one or more service communication devices 106. An example of the change in the laser beam-based communication route or switching from one optical routing device to another is shown and described, for example, in FIG. 6A.

FIG. 3C is a block diagram illustrating various components of an exemplary optical routing device of a communication system, in accordance with another exemplary embodiment of the disclosure. FIG. 3C is explained in conjunction with elements from FIGS. 1, 2, 3A and 3B. With reference to FIG. 3C, there is shown a block diagram 300B of the optical routing device 104N. The optical routing device 104N may be similar to that of the optical routing device 104A except that the optical routing device 104N may further include one or more lens 338A and 338B, one or more beam-splitters 340A and 340B, and one or more polarizers 342A and 342B.

In this embodiment, the optical routing device 104N may further comprise one or more lens 338A and 338B mounted on one or more laser beam handling regions 318 to cause one or more of: a) focus a laser beam deflected to a destination device, b) collimate the laser beam deflected to the destination device, or c) change a shape of the laser beam deflected to the destination device. In some implementations, each of the one or more lens 338A and 338B may be used to focus or collimate the laser beam, or to change the size or shape of the beam. Each of the one or more lens 338A and 338B may be made of a variety of materials, including glass, plastic, and quartz. In an implementation, a filter may be used to block or absorb certain wavelengths of light, which can be used to fine-tune the characteristics of a laser beam.

In accordance with an embodiment, the optical routing component 304 may further comprise one or more beam-splitters 340A and 340B. Each beam-splitter may be configured to split a laser beam of the plurality of laser beams into two or more laser beams or combine multiple laser beams into a single beam.

In an implementation, the one or more beam-splitters 340A and 340B may be fixedly mounted one or more laser beam handling regions 318 of the optical routing component 304. In another implementation, the one or more beam-splitters 340A and 340B may be movably mounted in the mounting component 302 independent of the one or more laser beam handling regions 318. The processor 306 may be configured to extend or retract the one or more beam-splitters 340A and 340B from the mounting component 302 based on the LBNC instructions received from the master communication device 102 or the cloud server 116.

In an exemplary implementation, at least one of the one or more beam-splitters 340A and 340B may be used in a case where the Laser Beam Mesh Network (LBMN) is generated, and one laser beam may be required to be formed into two or more separate laser beams. The one or more beam-splitters 340A and 340B may be free-space optical beam-splitters may or may not be used in laser beam cascaded network (LBCN) as cascaded deflection of one laser beam among multiple optical nodes, such as the plurality of optical routing devices 104, may be performed for downstream communication. Further, cascaded deflection of another laser beam for upstream communication may be sufficient to create the laser beam cascaded network (LBCN) using the one or more laser beam handling regions 318. In an implementation, at least one beam-splitter may be mounted at the location of one of the one or more laser beam handling regions 318, such as the first region 318A. Alternatively, at least one beam-splitter may be mounted at the optical routing component 304 at a specific position to maintain an alignment of an optical route for downstream path or an upstream path or both to perform free-space optical communication. Examples of the one or more beam-splitters 340A and 340B may include but are not limited to a cube beam-splitter (having two prisms joined together as a cube), a plate beam-splitter, a Dichroic mirror, a half-silvered mirror, a polarizing beam-splitter, or a micro-mirror cut in a specific shape such that when an laser beam strikes on the micro-mirror, the laser light splits in a defined ratio into two separate laser beams, or an arrangement of one or more specific shaped mirrors or prisms. In yet another example, one of the one or more laser beam handling regions 318, such as the first region 318A, may be filled with an optically active liquid (e.g., a chiral liquid) that has the ability to split a light beam, such as a laser beam into two separate laser beams. In yet another example, one of the one or more laser beam handling regions 318, such as the first region 318A may be made of crystal-like substance, such as calcite or quartz that may be cut in a specific shape to split a light beam, such as a laser beam into two or more separate laser beams. Moreover, the one or more beam-splitters 340A and 340B may be used in reverse to combine two different beams into a single one or a dedicated free-space optical beam combiner may be used. In an implementation, one of the one or more laser beam handling regions 318, such as the second region 310B, to combine two different beams into a single beam for upstream communication towards the master communication device 102. In an example, the third region 318C may be used to receive a third laser beam (e.g., beacon laser beam in a visible light spectrum, for example at around 800 nm) for an optical beam alignment and for the optical wireless charging of the rechargeable battery 314. In an implementation, the one or more beam-splitters 340A and 340B may be one of: a free-space optical wavelength splitter or combiner (i.e., free-space optical wavelength combiner) configured to either split an incoming laser beam of a first wavelength into different wavelengths or combine a plurality of incoming laser beams of different wavelengths into a single laser beam of the first wavelength.

In accordance with an embodiment, the optical routing component 304 may further comprise one or more polarizers 342A and 342B. The processor 306 may be further configured to control a polarization of the plurality of laser beams, such as the first laser beam 326A and the second laser beam 326B, via the one or more polarizers 342A and 342B. In an implementation, the one or more polarizers 342A and 342B may be used to control the polarization of the laser beam, which can be used to filter out unwanted reflections or to modify the properties of the laser beam, for example, to accommodate more data, using multiple polarizations. The one or more polarizers 342A and 342B may be a free-space optical beam polarizers. Polarized laser beams are light waves in which the vibrations occur in a single plane and the process of transforming unpolarized light into polarized light is known as polarization. Beneficially, each of the plurality of optical routing devices 104 may have two distinct laser beam handling regions, such as the first region 318A and the second region 318B (may also be referred to as deflection regions) to handle a pair of laser beams concurrently in which the first laser beam 326A may be used for downstream data communication in the downstream path and the second laser beam 326B may be used for upstream communication in the upstream path.

In an implementation, the optical routing device 104A may be a passive optical node, where there is no amplification of signals in the deflected one or more laser beams. Alternatively, in another implementation, the optical routing device 104A may be an active optical node, where optical amplification may be employed to boost the signal in order to overcome for power loss. For example, in the 1550 nm wavelength band, Erbium Doped Fiber Amplifiers (EDFA) may be used and for the 1300 nm wavelength band, Semiconductor Optical Amplifiers (SOA) may be employed.

The optical routing device 104A may further include the laser energy harvesting cell 316A and the charging handler 316B. Examples of the laser energy harvesting cell 316A may include, but is not limited to a photovoltaic cell that may handle visible light spectrum (400-800 nm wavelength), a dye-sensitized solar cell (DSSC), a plasmonic DDSC, or another type of laser energy harvesting cell that employs special nanoparticle-embedded energy harvesting cells like perovskite solar cells (PSCs), upconverting nanoparticles (UCNPs) or Infrared-to-visible photon up-conversion systems may be employed that can generate electricity not only from visible but also infrared or ultraviolet light spectrum. Typically, silicon-based photovoltaic cells are efficient at converting light in the visible and near-infrared spectrum, while other materials, such as nanoparticle-embedded energy harvesting cells, PSCs, UCNPs based photovoltaic cells may be more efficient at converting light in other wavelengths of the spectrum. The generated power than may be stored in an energy storage device, such as the rechargeable battery 314. The charging handler 316 may be the optical wireless charging handler that may be configured to manage the power generated by the laser energy harvesting cell 316A and may have safety mechanism to cut OFF an electrical connection between the laser energy harvesting cell 316A and the rechargeable battery 314 to prevent over-charging and ensure a safe charging process. In such a case, the laser energy harvesting cell 316A may be positioned at the third region 318C (i.e., the laser beam handling region) to harvest the third laser beam (i.e., the power laser or the beacon laser beam) from the master communication device 102. When the third laser beam strikes the laser beam handling region, such as the third region 318C, the laser energy harvesting cell 316A may absorbs the light energy and converts it into electrical energy, which is then stored in the rechargeable battery 314.

In operation, the master communication device 102 may be configured to obtain a first data signal from the data source 114A or the modem 114B (FIG. 1). The data source 114A or the modem 114B may be used to provide an Internet connection from an Internet service provider or from a core network of a telecommunication network. The first data signal may comprise wireless network data.

In accordance with an embodiment, the master communication device 102 may be configured to modulate the first data signal into the first laser beam 326A (FIG. 3B). The first data signal may be modulated into the first laser beam 326A using one or more of an intensity modulation, a phase modulation, a frequency modulation, and a polarization modulation. In intensity modulation, the intensity or power of the first laser beam 326A may be varied in accordance with the data to be transmitted. For example, if the data to be transmitted is a digital signal with two levels (0 and 1), the laser beam can be turned ON and OFF at a high frequency to represent a "1" and left "ON" continuously for a defined period to represent a "0". The master communication device 102 may include the laser handling system 220 that includes the laser transmitter 222 (e.g., a laser diode) and the modulation circuit 226. The laser transmitter 222 (e.g., the laser diode) may be used to generate the first laser beam 326A, and the modulation circuit 226 may be configured to modulate the intensity and/or any one of: a phase, frequency, or a polarization of the first laser beam 326A in accordance with the data to be transmitted. The phase of the first laser beam 326A refers to a relative timing of the peaks and troughs of the electromagnetic waves that make up the first laser beam 326A. The phase of the first laser beam 326A may be controlled and manipulated through various known techniques, such as using phase masks or introducing certain changes in the path that the first laser beam 326A travels through. In another example, wavelength division multiplexing (WDM) may be employed to modulate data in the first laser beam 326A. For instance, the first laser beam 326A may be generated at a specific wavelength, where data modulated in the first laser beam 326A at the specific wavelength may be extracted by a detector (i.e., a laser detector 422 of FIG. 4) of the service communication device 106A that is sensitive to the specific wavelength of the first laser beam 326A. In another example, multiple streams of data may be modulated and transmitted concurrently using WDM at different wavelengths to increase the capacity of the first laser beam 326A that may be transmitted in a downstream path in a laser-based wireless communication link towards the service communication device 106A.

In yet another example, a frequency shifting operation may be used to modulate the first signal into the first laser beam 326A. In this case, a frequency of the first laser beam 326A may be shifted slightly up or down to encode data. The shift in frequency may be achieved using a variety of methods, such as modulating the current that drives the laser transmitter 222 of the laser handling system 220 in the master communication device 102, or using a device called an acousto-optic modulator. In another example, a wavelength hopping operation may be performed, where the wavelength of the first laser beam 326A may be rapidly switched between different values to encode data, such as the first signal. The switching may be executed, for example, by use of a device called a diffraction grating or a micro-electromechanical system (MEMS) mirror. In yet another example, the polarization of the first laser beam 326A may be used to encode data. For example, the first laser beam 326A may be linearly polarized in different directions to represent different data bits. In yet another example, the intensity of the first laser beam 326A may be modulated to encode the first signal (i.e., data signal). For example, the first laser beam 326A may be turned on and off at different frequencies to represent different data bits.

The master communication device 102 may be further configured to direct the first laser beam 326A carrying the first data signal in a downstream path to a service communication device, such as the service communication device 106A, directly or via the plurality of optical routing devices 104 based on a plurality of defined connectivity criterions. In the present disclosure, the master communication device 102 do not require any intermediate routers or satellite routers in order to reach to remote end-user devices, such as the plurality of end-user devices 108. In other words, data do not need to traverse through multiple intermediate routers to reach to the remote client devices, such as the plurality of end-user devices 108. The master communication device 102 that includes the laser handling system 220 may further include the laser transmitter 222 that emits the first laser beam 326A carrying the first data signal towards, for example, the optical routing device 104A. The first laser beam may be emitted in a non-visible light spectrum when in operation. The optical routing device 104A may deflect (e.g., like a mirror) the first laser beam 326A carrying the first data signal to another optical routing device 104B, without any processing of the received first laser beam 326A carrying the first data signal. In other words, an angle, and a direction of the first laser beam 326A changes when the first laser beam 326A strikes the optical routing device 104A. The optical routing device 104B further deflects the first laser beam 326A further towards the service communication device 106A if the service communication device 106A is in a line-of-sight (LOS) to the optical routing device 104B. In a scenario where there is a direct LOS between the master communication device 102 and the service communication device 106A, and there is no signal obstruction or signal attenuation entity between the master communication device 102 and the service communication device 106A, the master communication device 102 may direct the first laser beam 326A carrying the first data signal in a downstream path to the service communication device 106A directly.

In accordance with an embodiment, the plurality of defined connectivity criterions may comprises a first criterion of an absence of a line-of-sight between the master communication device 102 and the service communication device 106A, a second criterion of a presence of a signal obstruction entity or a signal attenuating entity between the between the master communication device 102 and the service communication device 106A, and a third criterion of a presence of a signal-to-noise ratio (SNR) less than a defined threshold number of decibels at the second location of the service communication device 106A when test radio frequency (RF) signals are communicated from the master communication device 102. In such plurality of defined connectivity criterions, the master communication device 102 directs the first laser beam 326A carrying the first data signal to the service communication device 106A via the plurality of optical routing devices 104.

In accordance with an embodiment, when one or more of the first criterion, the second criterion, or the third criterion are met, the master communication device 102 may be further configured to determine the optical routing device 104A among the plurality of optical routing devices 104 to be selected to direct the first laser beam 326A carrying the first data signal in the downstream path, and calibrate an angle of projection of the first laser beam 326A from a reference point of the master communication device 102 to direct the first laser beam 326A carrying the first data signal in the downstream path towards the determined optical routing device 104A. The selection of the optical routing device 104A may be made based on a direct LOS of the optical routing device 104A from the master communication device 102. Other factors that may be considered include an alignment with the downstream path to maintain the alignment of the first laser beam 326A, and a beam width handling capability of an optical routing device. Although a wider beam may be used to transmit more data but may also be more susceptible to interference. Thus, a narrow pencil laser beam may be used in the form of the first laser beam 326A to generate laser beam-based communication links between two network nodes (i.e., starting from the master communication device 102 to the optical routing device 104A, followed by a laser beam-based communication link between two optical routing devices, and other successive optical routing devices until it reaches to the service communication device 106A in the downstream path) except for communication with end-user devices, such as the plurality of end-user devices 108.

The service communication device 106A may be configured to detect the first laser beam 326A carrying the first data signal in the downstream path. The service communication device 106A may include a laser detector (the laser detector 422 of FIG. 4) to detect the first laser beam 326A carrying the first data signal in the downstream path. In an example, the laser detector may be implemented as a photodiode or a phototransistor to detect the presence of the first laser beam 326A by converting the optical energy into an electrical current. In some implementation, an optical filter may be used to filter out any unwanted light, allowing only the desired laser wavelength to pass through to the laser detector to improve the signal-to-noise ratio and increase the accuracy of the detection. In some implementation, a feedback may be generated by the service communication device 106A by measuring a strength of the first laser beam 326A allowing for the detection of the presence of first laser beam 326A even if it is slightly misaligned with the laser detector. In such a case, the feedback may be used to automatically select another optical routing device from among the plurality of the optical routing devices 104 to maintain the laser beam based wireless connectivity and service continuity with the plurality of end-user devices 108. The feedback may be communicated to the master communication device 102 which then communicates the feedback to the cloud server 116. Alternatively, the feedback may be communicated to the cloud server 116 directly, for example, using radio frequency (RF) communication network (a fallback option) that may use existing RF-based Wi-Fi® network.

The service communication device 106A may be further configured to demodulate the first data signal from the first laser beam 326A and distribute one or more wireless signals to the plurality of end-user devices 108. The demodulation may depend on the modulation technique used during the modulation of the first data signal from the first laser beam

326A. The demodulation of the first data signal from the first laser beam 326A may be carried out using one or more known demodulation methods in free-space optics communication. For example, using direct detection, a coherent detection, a Frequency-shift keying (FSK) demodulation, a Phase-shift keying (PSK) demodulation, an Amplitude shift keying (ASK) demodulation, and the like. In the direct detection, the first laser beam 326A may be detected directly by the laser detector (e.g., a photodiode), where the output of the photodetector is then amplified and filtered to extract the first data signal (i.e., the data signal). For example, data may be encoded directly onto the intensity of the first laser beam 326A during modulation, where intensity of the laser beam is modulated to represent the binary 1s and 0s of the data. To demodulate the data, the laser detector may be used to convert the optical signal into an electrical signal, which is then processed to extract the data. In the coherent detection, the received first laser beam 326A may be mixed with a local oscillator (LO) beam of the same frequency, and the resulting beat frequency may be detected and demodulated to extract the first data signal (i.e., the data signal). In FSK demodulation, as the data may be encoded by shifting the frequency of the laser beam between two values, typically referred to as "mark" and "space" frequencies, a frequency discriminator can be used to demodulate the FSK-modulated laser beam and extract the data. In PSK demodulation, as the data may be encoded by shifting the phase of the first laser beam 326A between two or more values, a phase-locked loop (PLL) may be used to demodulate the PSK-modulated first laser beam 326A and extract the data. In ASK, the data may be encoded onto the amplitude of the first laser beam 326A, where amplitude of the first laser beam 326A may be modulated to represent the binary 1s and 0s of the data. In such a case, to demodulate the data, the laser detector may be used to convert the optical signal into an electrical signal, which is then processed to extract the data.

The service communication device 106A may be further configured to obtain one or more second data signals from the plurality of end-user devices 108 and re-transmit the obtained one or more signals over a second laser beam in an upstream path to the master communication device 102 directly or via the plurality of optical routing devices 104 based on the plurality of defined connectivity criterions. The one or more second data signals may be data signals received over RF waves from the plurality of end-user devices 108. The service communication device 106A may be further configured to extract user data (i.e., data signals) and re-modulate the extracted user data into the second laser beam, which is then transmitted the master communication device 102. The first laser beam 326A and the second laser beam form a laser backhaul in the defined indoor area 112 controlled by the master communication device 102 in coordination with the plurality of optical routing devices 104 and one or more service communication devices 106, such as the service communication device 106A. Advantageously, instead of a single laser beam handing both downstream and upstream communication that require certain synchronizations, such as time and/or frequency synchronization to route data from source to destination and back from destination to the source, the communication system 100 bifurcates the downstream path and the upstream path physically, i.e., by having two different laser beams (the first laser beam 326A and the second laser beam 326B). Thus, if one wavelength of the first laser beam 326A is employed for downstream path (e.g., for download) and another wavelength of the second laser beam is employed for routing back towards the master communication device 102, then there is even no need to have time division duplexing (TDD).

In accordance with an embodiment, the first data signal from the first laser beam 326A may be demodulated by the service communication device 106A and re-modulated into a plurality of different radio frequency (RF) signals associated with different communication protocols having different communication ranges (e.g., BLUETOOTH™, Wi-Fi® ™, Li-Fi, a citizens broadband radio service (CBRS) signal, and/or a wireless personal area network (WPAN) signal) to serve the plurality of end-user devices 108 in accordance with their wireless communication capabilities. The service communication device may be further configured to pack the content received from the plurality of end-user devices 108 and transmit upstream over the second laser beam to the master communication device 102 via the plurality of the optical routing devices 104.

In one implementation, each of the master communication device 102, the plurality of optical routing devices 104, and the one or more service communication devices 106, may have two distinct interfaces to handle two separate laser beam lights or routes. In accordance with an embodiment, each of the master communication device 102 and the service communication device 106A may comprise two distinct physical communication interfaces to handle a pair of laser beams concurrently in which the first laser beam 326A is used for downstream data communication in the downstream path and the second laser beam is used for upstream communication in the upstream path. Further, beneficially, each of the plurality of optical routing devices 104 may have two distinct deflection regions or laser beam handling regions to handle a pair of laser beams concurrently in which the first laser beam 326A is used for downstream data communication in the downstream path and the second laser beam is used for upstream communication in the upstream path. In accordance with an embodiment, the master communication device 102 may be further configured to exchange a plurality of data streams with the plurality of end-user devices 108 via a combination of the plurality of optical routing devices 104 and one or more service communication devices 106.

In accordance with an embodiment, the master communication device 102 may be further configured to generate a Laser Beam Mesh Network (LBMN) or a Laser Beam Cascaded Network (LBCN) using the plurality of optical routing devices 104 disposed at the plurality of locations in the defined indoor area 112 to wirelessly connect to one or more service communication devices 106 in the defined indoor area 112. An example of the Laser Beam Mesh Network (LBMN) is shown and described, for example, in FIG. 6B. An example of the Laser Beam Cascaded Network (LBCN) is shown and described, for example, in FIG. 6A.

In accordance with an embodiment, the master communication device 102 may be further configured to monitor performance data in terms of data rate, signal-to-noise ratio (SNR), a number of end-user devices connected to the service communication device and dynamically re-configure the generated Laser Beam Mesh Network (LBMN) or the Laser Beam Cascaded Network (LBCN). The data rate and the SNR of the one or more service communication devices 106 may be measured by the master communication device 102. In case of any sudden performance drop, the master communication device 102 may be further configured to dynamically re-configure the generated LBMN or the LBCN to maintain service continuity with the plurality of end-user devices 108, such as the UEs 108A and 108B.

In accordance with an embodiment, the master communication device 102 may be further configured to periodically communicate such performance data of the laser beam-based wireless communication network (i.e., the second communication network 120) to the cloud server 116. In an example, transmit laser power from laser transmitters as well as the optical receiver's received signal strength indicator (RSSI) for RF waves and laser power at the laser detectors at the one or more service communication devices 106 may be monitored. If transmit laser power has not degraded but the optical RSSI or laser power at the laser detectors indicates a drop in power, then an automatic optical alignment routine may be executed. The master communication device 102 may be further configured to receive the laser beam network control (LBNC) instructions from the cloud server 116. Thereafter, the master communication device 102 may be further configured to cause at least one optical routing device (e.g., the optical routing device 104B) of the plurality of optical routing devices 104 to dynamically adjust an orientation of a deflecting surface 320 of the at least one optical routing device, based on the received LBNC instructions from the cloud server 116. Based on the received LBNC instructions from the cloud server 116, the master communication device 102 may be further configured to dynamically change a laser beam-based communication route from the master communication device 102 to the service communication device 106A by changing a path of laser communication from a first set of optical routing devices to a second set of optical routing devices of the plurality of optical routing devices 104 to reach to the service communication device 106A. An example of the change in the laser beam-based communication route or switching from one optical routing device to another is shown and described, for example, in FIG. 6A.

In accordance with an embodiment, the service communication device 106A may be further configured to demodulate the first data signal from the first laser beam 326A and re-modulate into a plurality of different radio frequency (RF) signals associated with different communication protocols having different communication ranges to serve the plurality of end-user devices 108 in accordance with their wireless communication capabilities. In some implementations, the service communication device 106A may include not only an antenna for Wi-Fi® signals communication but also for communication in other personal area network (PAN) signals, such as BLUETOOTH™, a citizens' broadband radio service (CBRS) signal, and/or a wireless personal area network (WPAN) signals. In accordance with an embodiment, the service communication device 106A may be further configured to pack the content received from the plurality of end-user devices 108 and transmit upstream over the second laser beam (e.g., using WDM) to the master communication device 102.

Figure 4:
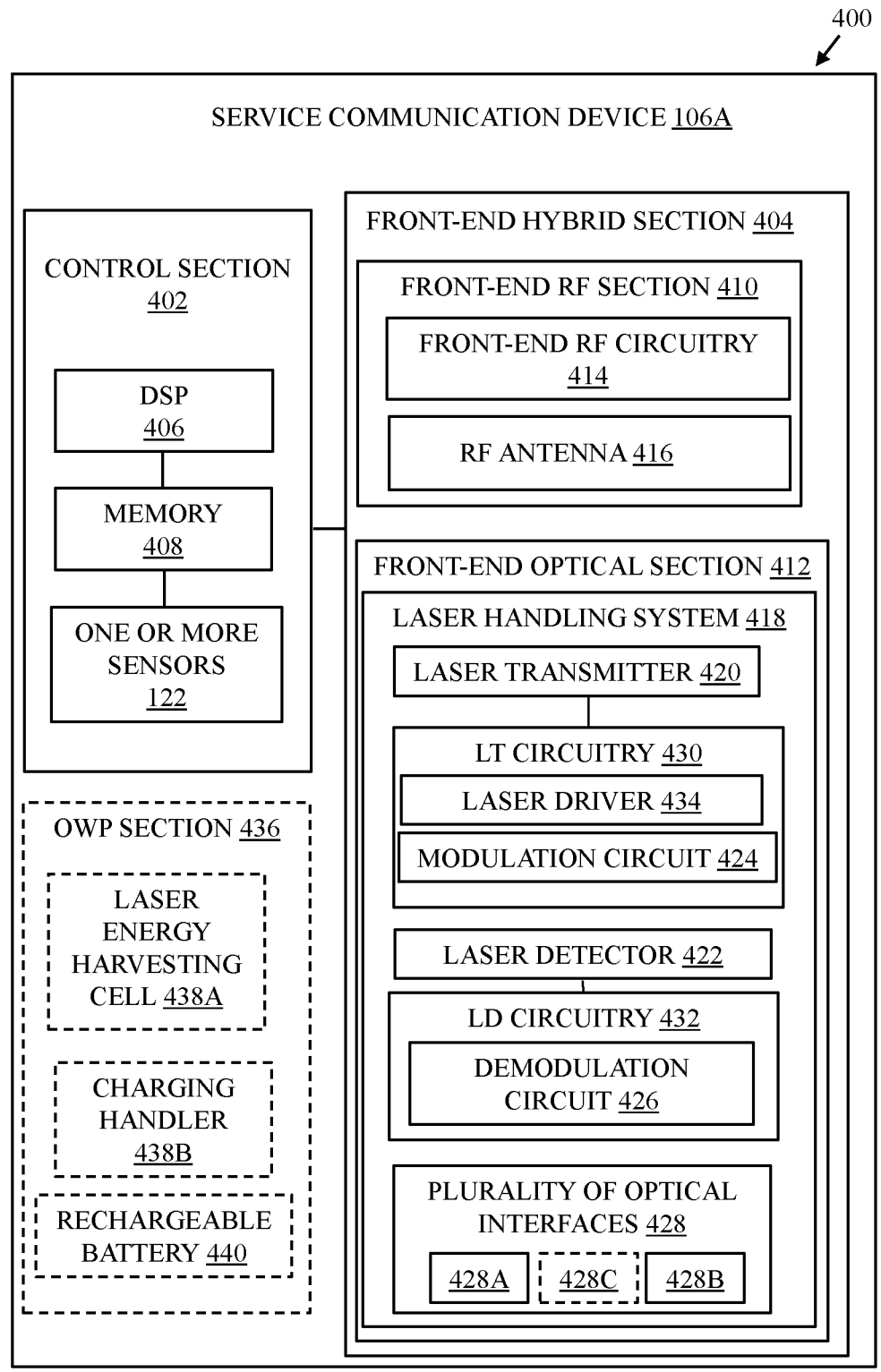
FIG. 4 is a block diagram that illustrates various components of an exemplary service communication device of a communication system, in accordance with an exemplary embodiment of the disclosure.

FIG. 4 is a block diagram illustrating various components of an exemplary service communication device of a communication system, in accordance with an exemplary embodiment of the disclosure. FIG. 4 is explained in conjunction with elements from FIGS. 1, 2, and 3. With reference to FIG. 4, there is shown a block diagram 400 of the service communication device 106A. The service communication device 106A may include a control section 402 and a front-end hybrid section 404. The control section 402 may include a DSP 406, a memory 408, and the one or more sensor 122 (of FIG. 1). The control section 402 may be communicatively coupled to the front-end hybrid section 404. The front-end hybrid section 404 may include a front-end RF section 410 and a front-end optical section 412. The front-end RF section 410 may include front-end RF circuitry 414 and a RF antenna 416. The front-end optical section 412 may include a laser handling system 418, which includes a laser transmitter 420, a laser detector 422, a modulation circuit 424, a demodulation circuit 426, and a plurality of optical interfaces 428. In an implementation, the laser handling system 418 may further include a laser transmission (LT) circuitry 430 and a laser detector (LD) circuitry 432. The LT circuitry 430 may include free-space laser transmitter electronics, such as a laser driver 434, the modulation circuit 424, and in some exemplary implementations, additionally one or more beam-shaping optics (not shown) similar to the master communication device 102. The LD circuitry 232 may include free-space laser detector electronics, such as the TIA for converting the current signal from the laser detector 422 to a voltage signal, a limiting amplifier for amplifying and cleaning the signal, and a Clock and Data Recovery (CDR) component for recovering clock and data signals from the incoming signal similar to that of the master communication device 102. The different components of the service communication device 106A maybe similar to that of the master communication device 102 expect that the service communication device 106A may not include a backhaul connection component, such as the backhaul connection component 214 of FIG. 2, and further the demodulation circuit 426 may be a dual-function circuit that not only demodulates the data signal from the first laser beam but also performs mapping of the extracted data to a RF wave to be emitted by the RF antenna 416 to the plurality of end-user devices 108 and further extracts data received from the plurality of end-user devices 108 via one or more RF waves in upstream path and passes to the modulation circuit 424.

Beneficially, the plurality of optical interfaces 428, especially the optical interfaces 428A and 428B, are special purpose physical interfaces to handle a plurality of laser beams concurrently segregating download and upload functions via a plurality of distinct laser beams. An optical interface, such as an optical interface 428A, may be coupled to the laser detector 422 to receive a focused narrow beam over the air, for example, from one of the plurality of optical routing devices 104. Another optical interface, such as an optical interface 428B, may be coupled to the laser transmitter 420 to focus the second laser beam in a defined beam width, such as into a narrow, collimated beam, for example, to the one of the plurality of optical routing devices 104. Further, another optical interface, such as an optical interface 428C, may be coupled to the laser energy harvesting cell 438A connected to the rechargeable battery 440 to charge the rechargeable battery 440 of the service communication device 106A. The optical interface 428C may also be used for optical beam alignment. Similar to that of the optical routing device 104A, the service communication device 106A may further include the charging handler 438B. In other words, in some implementation, the service communication device 106A may include the OWP section 436 that may include the laser energy harvesting cell 438A, the charging handler 438B, and the rechargeable battery 440 like the optical routing device 104A. In some implementations, the laser energy harvesting cell 438A may be a transceiver (e.g., metal halide perovskite transceiver) that may be employed for both absorbing light from and emitting light to other OWPT systems equipped with similar transceivers, and an additional laser diode may not be required. In an implementation, the DSP 406 may be further configured to dynamically adjust an orientation of the plurality of optical interfaces 428 of the service communication device 106A, based on the LBNC instructions received from the master communication device 102 or the cloud server 116.

Figure 5:
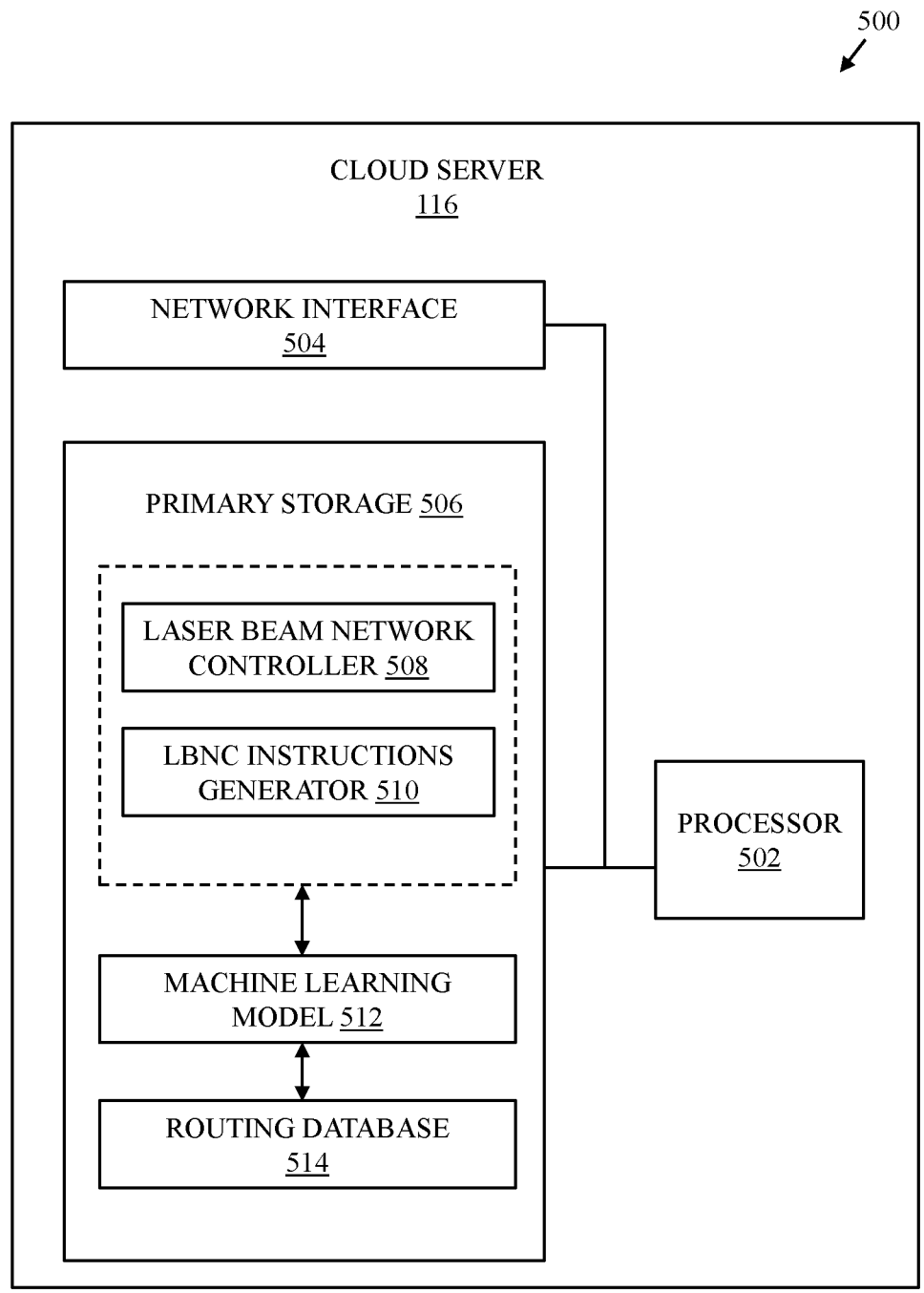
FIG. 5 is a block diagram that illustrates various components of an exemplary cloud server of a communication system, in accordance with an exemplary embodiment of the disclosure.

FIG. 5 is a block diagram illustrating different components of an exemplary cloud server, in accordance with an embodiment of the disclosure. FIG. 5 is explained in conjunction with elements from FIGS. 1, 2, 3A-3C, and 4. With reference to FIG. 5, there is shown a block diagram 500 of the cloud server 116. The cloud server 116 may include a processor 502, a network interface 504, and a primary storage 506. The primary storage 506 may further include a laser beam network controller 508 and a Laser Beam Network Control (LBNC) instructions generator 510. There is further shown a machine learning model 512 and a routing database 514. In an implementation, the cloud server 116 may be configured to acquire sensor data from the one or more sensors 122 through the master communication device 102 over the first communication network 118 (FIG. 1).

The routing database 514 may include one or more routing tables that stores a plurality of different laser-communication route options specific for each service communication device of the one or more service communication devices 106. Similarly, it also stores fall-back laser-link options for each optical routing device of the plurality of optical routing devices 104. The fall-back laser-link options for each optical routing device may include location coordinates of each optical routing device and corresponding two or more neighbouring optical routing devices and laser beam alignment information, such as an angle of deflection of a laser beam, a direction of deflection of the laser beam, a beam width of the laser beam, and a laser intensity to be set for the laser beam, between two optical routing devices. The fall-back laser-link options for each of the plurality of optical routing devices 104 may be used to generate the plurality of different laser-communication route options. There may be different look-up tables used for upstream path and the downstream path.

In an implementation, the processor 502 may determine the fall-back laser-link options for each of the plurality of optical routing devices 104 and the plurality of different laser-communication route options based on at least location coordinates of the master communication device 102, the one or more service communication device 106, and the plurality of optical routing devices 104. The processor 502 may be further configured to use the machine learning model 512 to determine the fall-back laser-link options for each of the plurality of optical routing devices 104 and the plurality of different laser-communication route options based on at least location coordinates and environment mapping data of the defined indoor area 112. The environment mapping data may be indicative of a 3D physical structure of the defined indoor area 112, such a 3D layout of an apartment or an enterprise.

In accordance with an embodiment, the processor 502 may be configured to cause the master communication device 102 to generate a Laser Beam Mesh Network (LBMN) or a Laser Beam Cascaded Network (LBCN) using the plurality of optical routing devices 104 disposed at the plurality of locations in the defined indoor area 112 to wirelessly connect to one or more service communication devices 106 in the defined indoor area 112. Such generation of the Laser Beam Mesh Network (LBMN) or a Laser Beam Cascaded Network (LBCN) may be executed based on the sensor data obtained from the one or more sensors 122 at each optical node directly or via the master communication device 102 over the first communication network 118 (FIG. 1). An example of the LBMN and the LBCN is shown and described, for example, in FIGS. 6A and 6B. The processor 502 may be further configured to obtain performance data in terms of data rate, signal-to-noise ratio (SNR), a number of end-user devices connected to the one or more service communication devices 106, from the master communication device 102. The processor 502 may be further configured to cause the master communication device 102 to dynamically re-configure the generated Laser Beam Mesh Network (LBMN) or the Laser Beam Cascaded Network (LBCN) based on a change in the performance data that is beyond threshold. The changes, such as a drop in the performance data may be because of a default in alignment of laser beams between two optical routing devices or between one optical routing device and a service communication device, such as the service communication device 106A, or a new signal obstruction entity obstructs or interferes with the laser beam path.

In accordance with an embodiment, the processor 502 may be further configured to communicate LBNC instructions from the cloud server 116 to the master communication device 102. Thereafter, the processor 502 causes the master communication device 102 to instruct at least one optical routing device (e.g., the optical routing device 104B) of the plurality of optical routing devices 104 to dynamically adjust an orientation of a deflecting surface 320 of the at least one optical routing device, based on the communicated LBNC instructions. The LBNC instructions may be generated by the LBNC instructions generator 510 in coordination with the laser beam network controller 508. The laser beam network controller 508 is configured to monitor, manage, and remotely control one or more network management functions of the laser beam based wireless communication network (i.e., the second communication network 120) to enhance the network coverage area, bandwidth, reliability, and configurability in which a reconfigurable optical wireless backhaul is achieved. In accordance with an embodiment, the processor 502 may be further configured to cause the master communication device 102 to dynamically change a laser beam-based communication route from the master communication device 102 to the service communication device 106A by changing a path of laser communication from a first set of optical routing devices to a second set of optical routing devices of the plurality of optical routing devices 104 to reach to the service communication device 106A. Such a change in the laser beam-based communication route may be controlled based on a periodic communication of the LBNC instructions. In an implementation, the processor 502 may be configured to utilize the determined fall-back laser-link options for each of the plurality of optical routing devices 104 and the plurality of different laser-communication route options to cause the master communication device 102 to dynamically change the laser beam-based communication route.

Figure 6A:
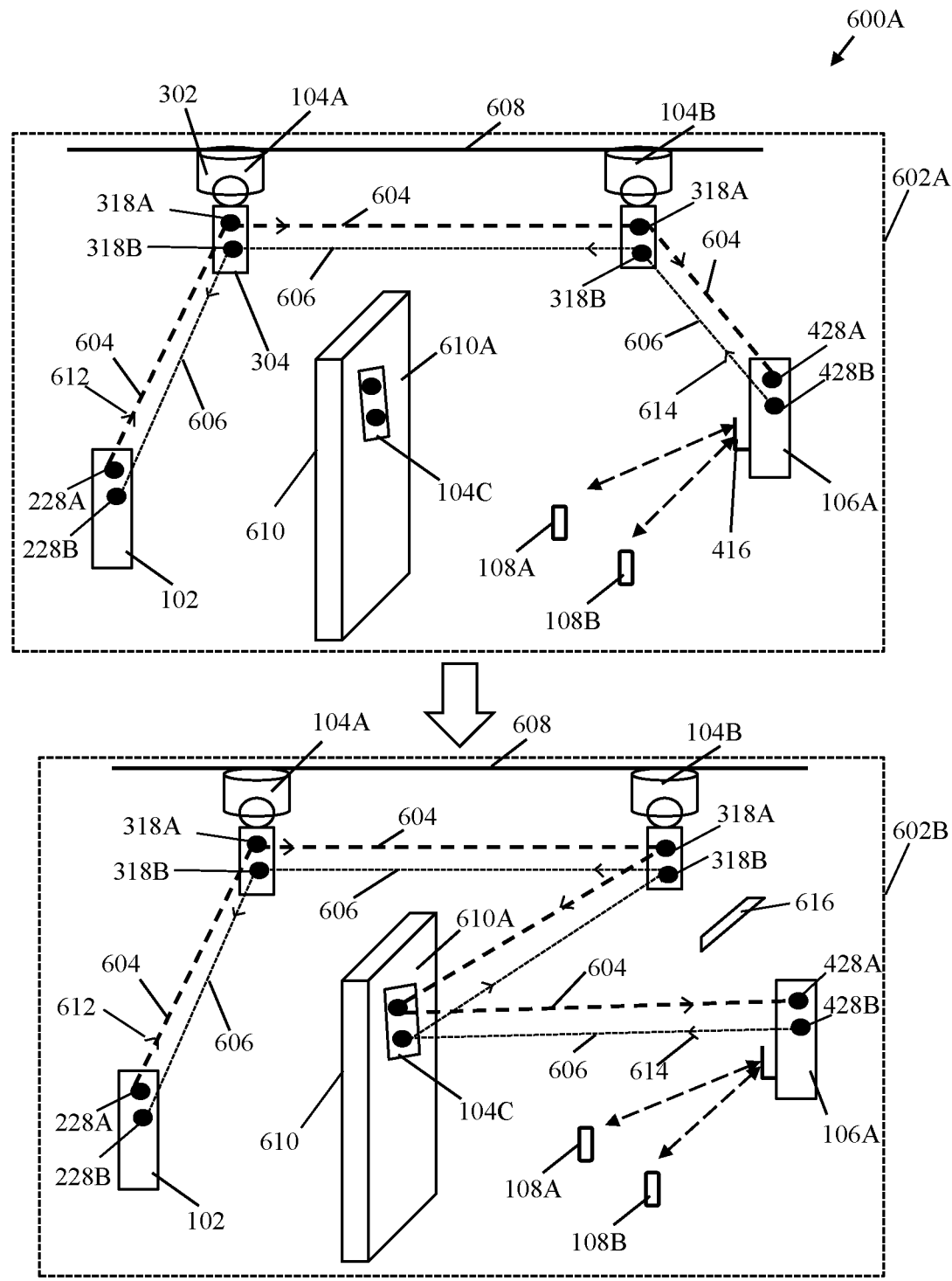
FIG. 6A is a diagram illustrating an exemplary implementation of a communication system with optical routing devices for ultra-flexible and ultra-reliable laser beam based wireless communication in an indoor area, in accordance with an exemplary embodiment of the disclosure.

FIG. 6A is a diagram illustrating an exemplary implementation of a communication system with optical routing devices for ultra-flexible and ultra-reliable laser beam based wireless communication in an indoor area, in accordance with an exemplary embodiment of the disclosure. FIG. 6A is explained in conjunction with elements from FIGS. 1-5. With reference to FIG. 6A, there is shown an exemplary scenario of a Laser Beam Cascaded Network (LBCN) 600A generated using the plurality of optical routing devices 104, such as the optical routing devices 104A, 104B, or 104C in this case.

In a first scenario 602A, the master communication device 102 is configured to obtain a first data signal from the modem 114B via a wired medium, such as an optical fibre. The master communication device 102 may be a modified and intelligent wireless access point that uses existing Wi-Fi® signal in RF medium to control the optical routing devices 104A and 104B and employs laser beams to form the LBCN 600A and communicate data in a cascaded structure via two distinct laser beams to reach to the service communication device 106A (i.e., another modified wireless access point). In the LBCN 600A, the plurality of optical routing devices 104, such as the optical routing devices 104A and 104B are connected in series between the master communication device 102 and the service communication device 106A, as shown, in an example. The mounting component 302 of some of the optical routing devices, such as the optical routing device 104A, may be mounted on a ceiling surface 608. The mounting component 302 may be movable in 360 degrees around an axis (e.g., Y axis, a vertical axis with respect to the ceiling surface 608), and at least 30 degrees up and down with respect to the ceiling surface 608. The optical routing device 104C may be mounted on a wall surface 610A.

In the first scenario 602A, there is an absence of a line-of-sight between the master communication device 102 and the service communication device 106A. Further, there is a presence of a signal obstruction entity 610 between the master communication device 102 and the service communication device 106A. Furthermore, there is a presence of a signal-to-noise ratio (SNR) less than a defined threshold number of decibels is detected at the second location of the service communication device 106A when test radio frequency (RF) signals are communicated from the master communication device 102 via RF waves (e.g., one of the RF antenna 218) in omni-directions. In this case, the master communication device 102 may be configured to determine the optical routing device 104A among the plurality of optical routing devices 104 to be selected to direct the first laser beam 604 carrying the first data signal in the downstream path 612. The master communication device 102 may be configured to calibrate an angle of projection of the first laser beam 604 from a reference point of the master communication device 102 to direct the first laser beam carrying the first data signal in the downstream path 612 towards the determined optical routing device 104A. In this case, the reference point of the master communication device 102 may be an axis orthogonal to the optical interface 228A. Thus, the master communication device 102 via the laser transmitter 222 may be further configured to direct the first laser beam 604 carrying the first data signal in the downstream path 612 for downstream communication to the service communication device 106A via the optical routing devices 104A and 104B. The laser detector 422 of the service communication device 106A may be configured to detect the first laser beam 604 carrying the first data signal in the downstream path 612. The demodulation circuit 426 of the service communication device 106A may be configured to demodulate the first data signal from the first laser beam 604, and the RF antenna 416 may be configured to distribute the one or more wireless RF signals (e.g., in 5 GHz, 6 GHZ, or 7 GHz frequency) to the UEs 108A and 108B after re-modulating the demodulated first data signal into the one or more wireless RF signals. Thereafter, the service communication device 106A (e.g., via the RF antenna 416) may be further configured to obtain one or more second data signals (i.e., RF signals) from the UEs 108A and 108B and re-transmit over a second laser beam 606 in an upstream path 614 to the master communication device 102 via the optical routing devices 104A and 104B. The DSP 406 or the demodulation circuit 426 (FIG. 4) may be configured to extract user data from the one or more second RF signals, and the modulation circuit 424 may then re-modulate the extracted user data into the second laser beam 606. The second laser beam 606 may be directed by the laser transmitter 420 (FIG. 4) from the optical interface 428B under the control of the DSP 406 towards the optical routing device 104B, as shown, which is then deflected from the second region 310B of the optical routing device 104B to the second region 310B of the optical routing device 104A via the LBCN 600A to reach the master communication device 102 for upstream communication. Advantageously, a pair of laser beams such as the first laser beam 604 and the second laser beam 606 may be concurrently operated in which the first laser beam 604 is used for downstream data communication in the downstream path 612 and the second laser beam 606 is used for upstream communication in the upstream path 614. Similarly, the optical routing component 304 may comprise the one or more laser beam handling regions 318 configured to handle a plurality of laser beams concurrently in which the first laser beam 604 may be deflected via the first region 318A of the one or more laser beam handling regions 318 for downstream data communication in the downstream path 612 and a second laser beam 606 is deflected via the second region 318B of the one or more laser beam handling regions 318 for upstream data communication in the upstream path 614. In this case, the one or more laser beam handling regions 318 may be a plurality of deflection regions, as only deflection is performed passively without the need to perform any signal processing. Thus, a full coverage with high SNR (e.g., greater than 40 decibels) in different physical spaces is ensured including all nooks and corners of the defined indoor area 112 with high-speed data connectivity to end-user devices, such as the UEs 108A and 108B without the need to deploy costly and ineffective conventional intermediate routers with limited bandwidth that process signals, for example, for signal amplification. The concurrent handling of the pair of laser beams such as the first laser beam 604 and the second laser beam 606 for distinct but smooth downstream and upstream data communication improves data transfer rates (e.g., in double digit gigabit rate or even terabyte rate) between at least two remote wireless communication devices (such as two WAPs) in indoor scenario as compared to existing wireless systems (e.g., conventional wireless local area networks).

Furthermore, the master communication device 102 may be configured to monitor performance data in terms of data rate, signal-to-noise ratio (SNR), a number of end-user devices connected to the service communication device 106A. The master communication device 102 may be further configured to periodically communicate such performance data of the LBCN 600A to the cloud server 116. In an example, transmit laser power from laser transmitters (e.g., the laser transmitter 222 of FIG. 2 and the laser transmitter 420 of FIG. 4) as well as the receiver optical received signal strength indicator (RSSI) and laser power at the laser detector 422 at the service communication device 106A may be monitored. If transmit laser power has not degraded but the optical RSSI or laser power at the laser detector 422 indicates a drop in power, then an automatic optical alignment routine is executed.

In a second scenario 602B, there may be some changes in the monitored performance data. The changes, such as a drop in the performance data may be because of a default in alignment of laser beams between the optical routing device 104B and the service communication device 106A, or when the laser power has not degraded but the RSSI indicates a drop in power, or a new signal obstruction entity 616 obstructs or interferes with the laser beam path. In such scenarios, a laser beam-based communication route may be dynamically changed from the master communication device 102 to the service communication device 106A by changing a path of laser communication from a first set of optical routing devices 104A and 104B to a second set of optical routing devices 104A, 104B, and 104C to reach to the service communication device 106A. This is done to maintain service continuity to the UEs 108A and 108B.

Figure 6B:
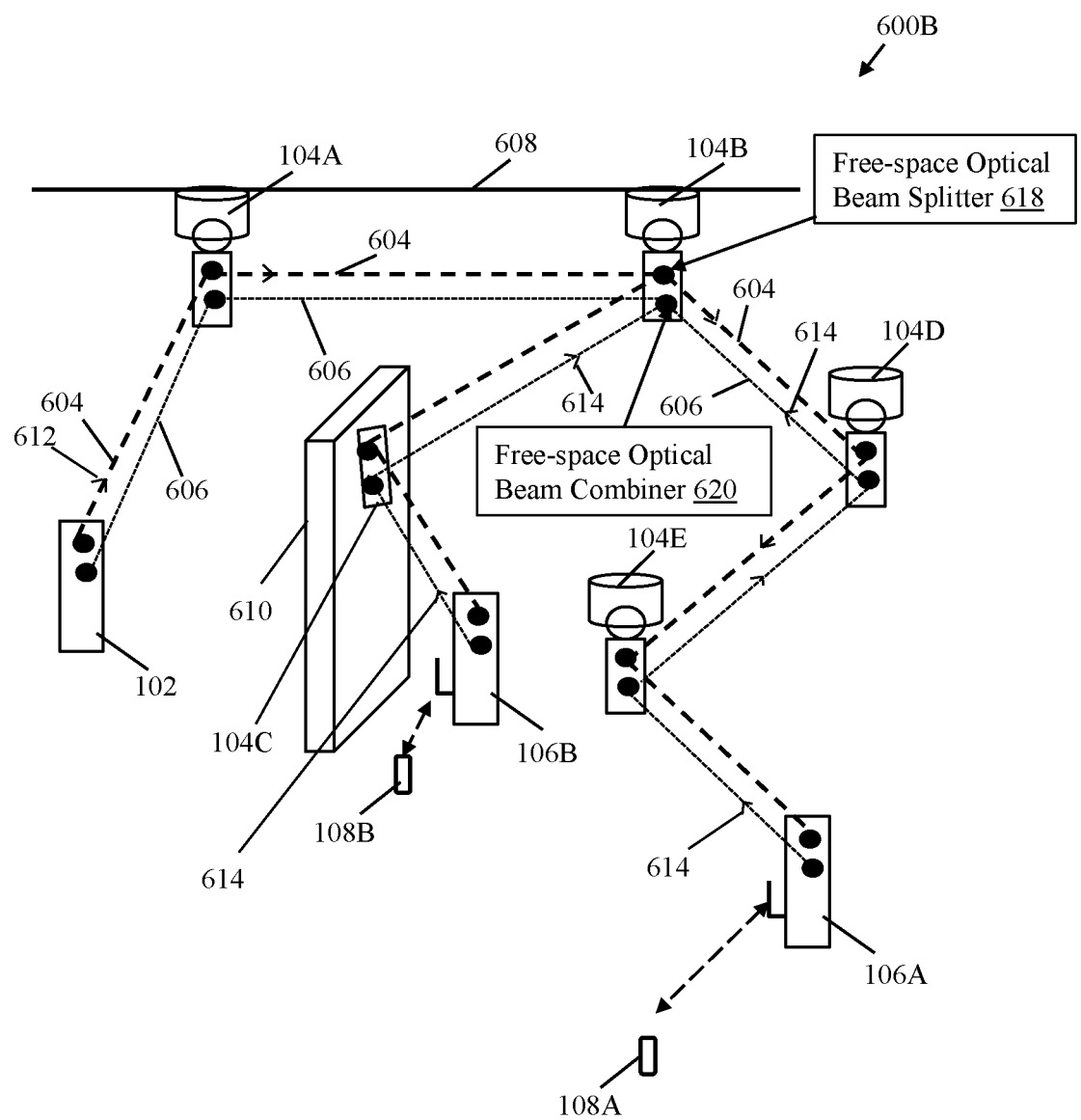
FIG. 6B is a diagram illustrating another exemplary implementation of a communication system with optical routing devices for ultra-flexible and ultra-reliable laser beam based wireless communication in an indoor area, in accordance with an exemplary embodiment of the disclosure.

FIG. 6B is a diagram illustrating another exemplary implementation of a communication system with optical routing devices for ultra-flexible and ultra-reliable laser beam based wireless communication in an indoor area, in accordance with an exemplary embodiment of the disclosure. FIG. 6A is explained in conjunction with elements from FIGS. 1-5. With reference to FIG. 6A, there is shown an exemplary scenario of a Laser Beam Mesh Network (LBMN) 600B generated using the optical routing devices 104A, 104B, 104C, 104D, and 104E. In this implementation, there are multiple service communication devices, such as the service communication devices 106A and 106B, each servicing its users, such as the UE 108A and the UE 108B, respectively.

Unlike a typical Wi-Fi® system, where there is only one broadcast device and hence a limited coverage area, there are certain other conventional Wi-Fi® systems that provide comparatively wider coverage by broadcasting from the main router to several satellite routers, which then broadcast to its client devices. The communication between the main router connected to the Internet and the satellite routers fed by the main router may be carried by the Backhaul. In order for the backhaul to not compete with the client devices for network bandwidth, one Wi-Fi® band is typically dedicated to the backhaul in such conventional systems. The reach and performance of these conventional systems and topology are fundamentally limited by the bandwidth of the dedicated band, and by the number of intermediate satellite routers that the data must traverse in order to reach remote client devices. While the backhaul connections can be done with physical cables which offer wider bandwidth than a Wi-Fi® band, cable installation and reconfiguration are extremely costly and slow. Further, conventional mesh Wi-Fi® system performance is heavily affected by the bandwidth of the backhaul and how the system manages the communication between the mesh router and its satellites, i.e., the satellite routers or intermediate routers.

In contract to the conventional systems, the master communication device 102 may be further configured to cause the optical routing devices 104A, 104B, 104C, 104D, and 104E to dynamically adjust the orientation of the deflecting surface 320 (which includes the one or more laser beam handling regions 318) of the optical routing component 304 to form the LBMN 600B.

In an implementation, the LBMN 600B may be generated based on instructions received from the cloud server 116. The master communication device 102 via the laser transmitter 222 may be further configured to direct the first laser beam 604 carrying the first data signal in the downstream path 612 for downstream communication to the service communication devices 106A and 106B via the LBMN 600B. A laser beam-based communication route in the downstream path 612 and the upstream path 614 from the master communication device 102 to the service communication device 106A in the LBMN 600B may be via the optical routing devices 104A, 104B, 104D, and 104E. In this case, in the downstream path 612, the optical routing device 104B, which is a passive optical node, may include a free-space optical beam splitter 618 (e.g., a plate beam splitter) that splits the received laser beam in the downstream path 612 into two (or more) separate laser beams (as shown), where one laser beam from such optical split is directed towards the optical routing device 104D (which may be a passive optical routing device) and the other laser beam from such optical split is directed towards the optical routing device 104C to form the LBMN 600B. In an implementation, such split by the free-space optical beam splitter 618 may cause the received laser beam in the downstream path 612 in a first wavelength to split into two separate laser beams having same wavelengths (i.e., the first wavelength). In another implementation, such optical split by the free-space optical beam splitter 618 may cause the received laser beam in the downstream path 612 in a first wavelength to split into two separate laser beams having different wavelengths. Further, in this case, in the upstream path 614, the optical routing device 104B may further include a free-space optical beam combiner 620 (e.g., a plate beam combiner) that combines two received laser beams (one each from the optical routing devices 104D and 104C) in the upstream path 614 into a single laser beam (as shown) to form the LBMN 600B for upstream data communication. Similarly, another laser beam-based communication route in the downstream path 612 and the upstream path 614 from the master communication device 102 to the service communication device 106B in the LBMN 600B may be via the optical routing devices 104A, 104B, and 104C. The processor 306 may be further configured to receive an instruction via the one or more RF supervisory links to control a movement of the mounting component 302 along with the optical routing component 304 such that an angle or a direction of deflection of one or more laser beams from the optical routing component 304 is changed. In this case, the optical routing component 304 may comprise the one or more laser beam handling regions 318 configured to handle a plurality of laser beams concurrently in which the first laser beam 604 may be deflected via the first region 318A of the one or more laser beam handling regions 318 for downstream data communication in the downstream path 612 and a second laser beam 606 is deflected via the second region 318B of the one or more laser beam handling regions 318 for upstream data communication in the upstream path 614. Alternatively, the optical routing component 304 may be configured to handle one laser beam over-the-air in the laser-beam based wireless communication network for both downstream and upstream data communication with the master communication device 102 and the one or more service communication devices 106, such as the service communication devices 106A and 106B. In other words, there are two ways of communication to form the laser-beam based wireless backhaul (i.e., the laser-beam based wireless communication network). In a first implementation, there may be two laser beams (the first laser beam 604 and second laser beam 606) for a free-space laser communication with separate transmission (Tx) and reception (Rx). In a second implementation, called bi-directional, there may be single laser beam for Tx and Rx but at two different wavelengths using WDM. The wavelength splitting and combining may be performed passively using a dichroic mirror. Thus, a full coverage with high signal-to-noise (SNR) in an indoor area with high-speed data connectivity to end-user devices, such as the UE 108A and the UE 108B may be provided without the need to deploy conventional RF intermediate routers simplifying the deployment while significantly improving the data throughput as compared to conventional systems.

Figure 7A:
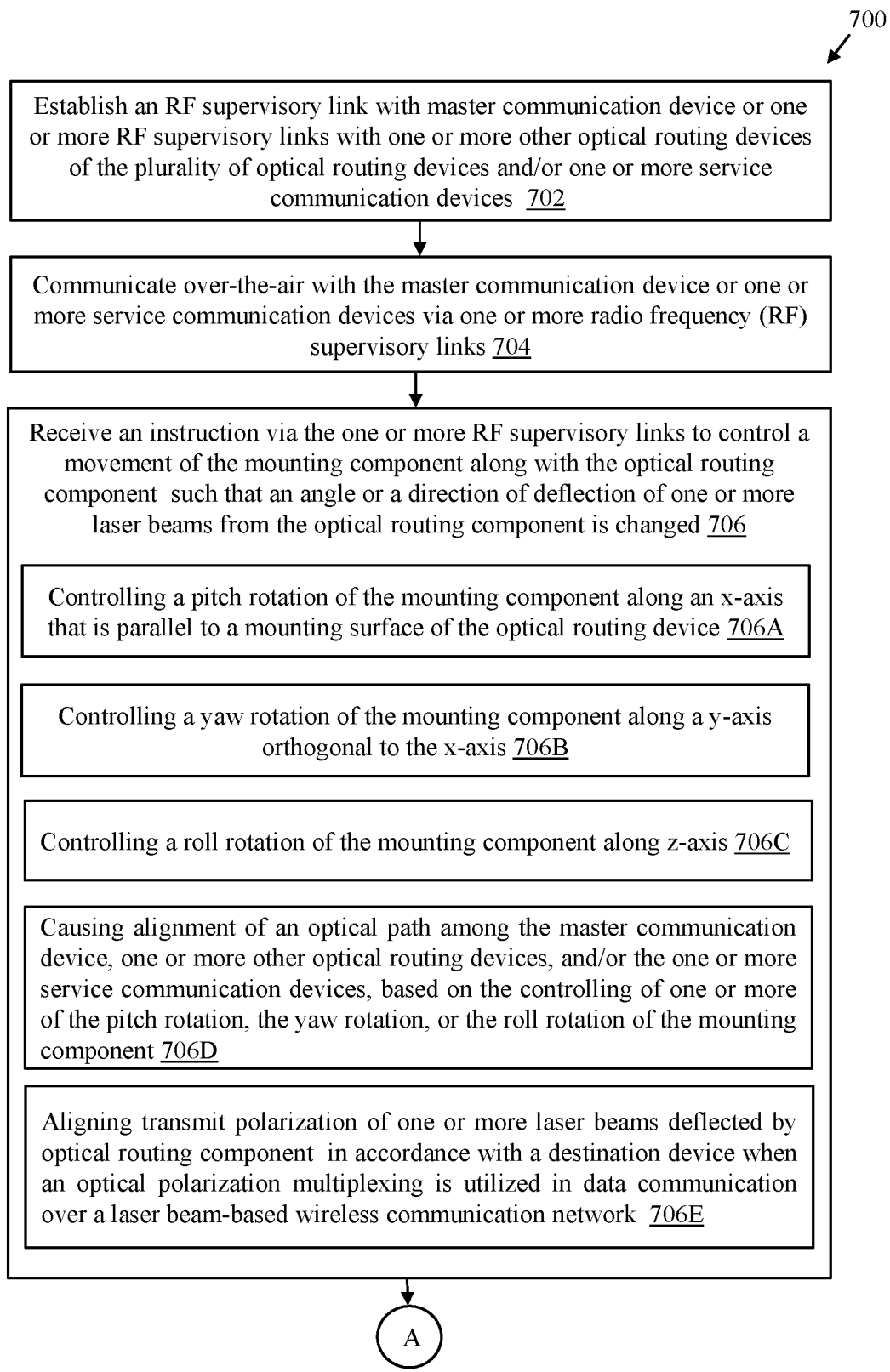
FIGS. 7A, 7B, and 7C collectively, is a flowchart that illustrates an exemplary method for operating an optical routing device for ultra-flexible and ultra-reliable laser beam based wireless communication for indoor use, in accordance with an embodiment of the disclosure.
Figure 7B:
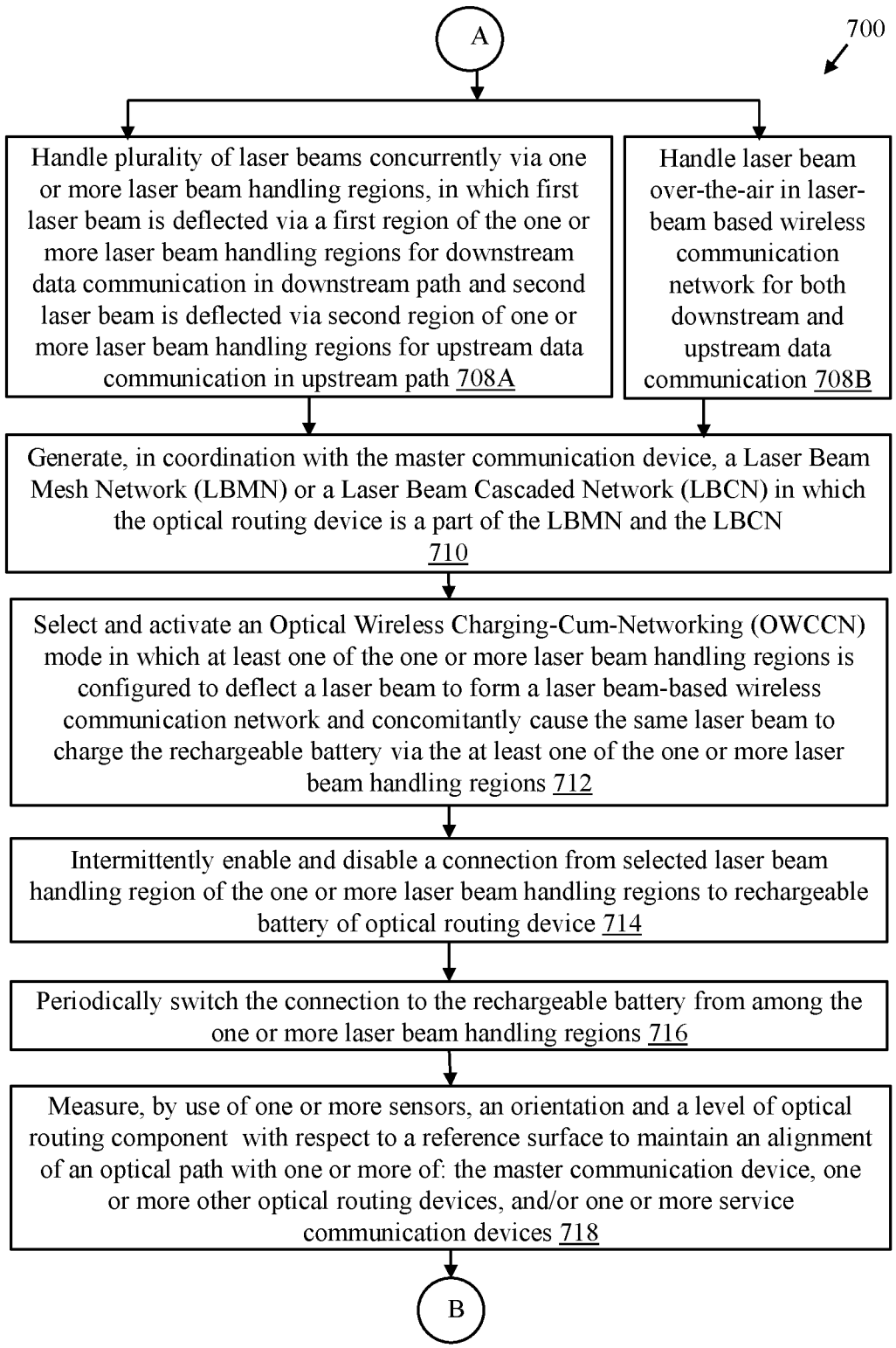
Figure 7C:
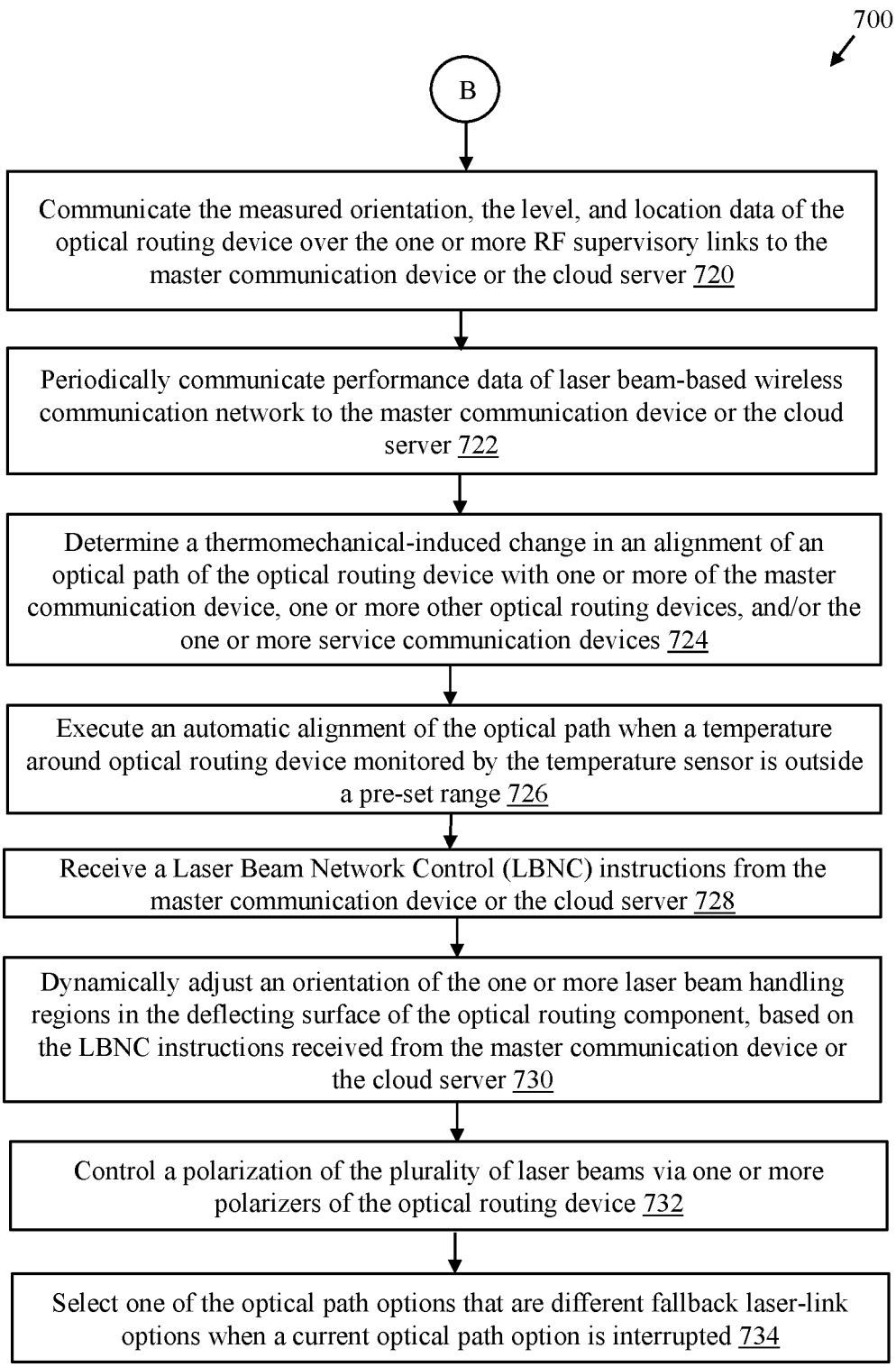

FIGS. 7A, 7B, and 7C, collectively, is a flowchart that illustrates an exemplary method for operating an optical routing device for ultra-flexible and ultra-reliable laser beam based wireless communication for indoor use, in accordance with an embodiment of the disclosure. FIGS. 7A, 7B, and 7C are explained in conjunction with elements from FIGS. 1, 2, 3A to 3C, 4, 5, 6A, and 6B. With reference to FIGS. 7A, 7B, and 7C there is shown a flowchart 700 comprising exemplary operations 702 through 734. The operations 702 to 734 may be executed by the optical routing device 104A.

At 702, a radio frequency (RF) supervisory link with the master communication device 102 or one or more RF supervisory links with one or more other optical routing devices of the plurality of optical routing devices 104 and/or one or more service communication devices 106, may be established. In a case where the optical routing device 104A is a primary optical deflector node, the processor 306 may be configured to establish the RF supervisory link with the master communication device 102. In a case where the optical routing device 104A is a secondary optical deflector node, the processor 306 may be configured to establish the one or more RF supervisory links with one or more other optical routing devices of the plurality of optical routing devices 104 and/or the one or more service communication devices 106.

At 704, communication (e.g., of control signals or sensor data etc.) may be made over-the-air with the master communication device 102 or the one or more service communication devices 106 via the one or more radio frequency (RF) supervisory links.

At 706, an instruction may be received via the one or more RF supervisory links to control a movement of the mounting component 302 along with the optical routing component 304 such that an angle or a direction of deflection (or routing after beam splitting) of one or more laser beams from the optical routing component 304 is changed. The operation 706 may include one or more sub-operations 706A to 706E.

At 706A, a pitch rotation of the mounting component 302 may be controlled along an x-axis 330A that is parallel to a mounting surface 328 of the optical routing device 104A. The control of the movement may be in response to the instruction received from the master communication device 102 or the cloud server 116 via the one or more RF supervisory links. At 706B, a yaw rotation of the mounting component 302 may be controlled along the y-axis 330B orthogonal to the x-axis 330A. At 706C, a roll rotation of the mounting component 302 may be controlled along the z-axis 330C. At 706D, an alignment of an optical path may be caused among the master communication device 102, one or more other optical routing devices, and/or the one or more service communication devices 106, based on the controlling of one or more of the pitch rotation, the yaw rotation, or the roll rotation of the mounting component 302. At 706E, a transmit polarization of the one or more laser beams (e.g., the first laser beam 326A or 604 and the second laser beam 326B or 606) deflected by the optical routing component 304 may be aligned in accordance with a destination device when an optical polarization multiplexing is utilized in data communication over a laser beam-based wireless communication network. The destination device may be one of the master communication device 102, one or more other optical routing devices, or the one or more service communication devices 106. The control may then pass to 708A or 798B depending on a use case.

At 708A, a plurality of laser beams may be concurrently handled (i.e., deflected or focussed) via the one or more laser beam handling regions 318 in which the first laser beam (e.g., the first laser beam 326A or 604) may be deflected via the first region 318A of the one or more laser beam handling regions 318 for downstream data communication in a downstream path and a second laser beam (e.g., the second laser beam 326B or 606) may be deflected via the second region 318B of the one or more laser beam handling regions 318 for upstream data communication in an upstream path. In accordance with an embodiment, different wavelengths may be utilized for the first laser beam (e.g., at 1550 nm band) and the second laser beam (e.g., at 1300 nm band) for downstream and upstream data communication respectively.

At 708B, a laser beam may be handled (i.e., deflected, focused, or routed) by one or more laser beam handling regions of the optical routing component 304 over-the-air in a laser-beam based wireless communication network for both downstream and upstream data communication with the master communication device 102 and the one or more service communication devices 106. In this implementation, the laser beam may comprise a plurality of data streams modulated in at least one of a coarse wavelength division multiplexing (CWDM), a dense wavelength division multiplexing (DWDM), or another wavelength division multiplexing, for the downstream and upstream data communication. In this case, a single laser beam includes both Tx and Rx communication paths but at two different wavelengths done using WDM. The wavelength splitting and combining may be performed passively using a dichroic mirror. Additional wavelength channels (i.e., communication data lanes) may offer a path to increasing the data rate. For example, coarse wavelength division multiplexing (CWDM) may allow up to 18 channels and dense wavelength division multiplexing (DWDM) may allow up to 200 channels.

At 710, a Laser Beam Mesh Network (LBMN) or a Laser Beam Cascaded Network (LBCN) may be generated in coordination with the master communication device 102, in which the optical routing device is a part of the LBMN and the LBCN.

At 712, an Optical Wireless Charging-Cum-Networking (OWCCN) mode may be selected and activated in which at least one of the one or more laser beam handling regions 318 may be configured to deflect a laser beam to form a laser beam-based wireless communication network and concomitantly cause the same laser beam to charge the rechargeable battery 314 via the at least one of the one or more laser beam handling regions 318. The processor 306 may be further configured to activate the OWCCN mode. In an example, the decision of which deflection region to select from the one or more laser beam handling regions 318 to charge the rechargeable battery 314 may be based on the data traffic in the upstream path or the downstream path. For example, the second region 318B of the one or more laser beam handling regions 318 may be selected if data traffic in the downstream path is less than the upstream path if the second region 318B is used for the downstream data communication in the downstream path. In another example, the decision of which deflection region to select from the one or more laser beam handling regions 318 may not be based on data traffic and may be predetermined. Alternatively, one of the one or more laser beam handling regions, such as the second region 318B, is configured to handle an additional laser beam (e.g., power laser or beacon laser beam at around 800 nm) over-the-air for an optical wireless power transmission to remotely charge a corresponding rechargeable battery of each of one or more other optical routing devices and/or the service communication device 106A.

At 714, a connection from the selected deflection region of the one or more laser beam handling regions 318 to the rechargeable battery 314, may be intermittently enabled and disabled. The processor 306 may be further configured to intermittently enable and disable the connection from the selected deflection region to the rechargeable battery 314 of the optical routing device 104A.

At 716, the connection to the rechargeable battery 314 may be switched from among the one or more laser beam handling regions 318. In other words, the connection of the first region 318A to the rechargeable battery 314 via a first photovoltaic cell of the charging handler 316B may be periodically disabled, whereas the connection of the second region 318B to the rechargeable battery 314 via a second photovoltaic cell of the charging handler 316B may be periodically enabled, and vice-versa.

At 718, an orientation and a level of the optical routing component 304 may be measured with respect to the reference surface 334 by use of the one or more sensors 322 to maintain an alignment of an optical path with one or more of the master communication device 102, one or more other optical routing devices, and/or the one or more service communication devices 106.

At 720, the measured orientation, the level, and location data of the optical routing device 104A may be communicated over the one or more RF supervisory links to the master communication device 102 or the cloud server 116. The processor 306 may be further configured to communicate the measured orientation, the level, and location data of the optical routing device 104A to the master communication device 102 or the cloud server 116.

At 722, performance data of the laser beam-based wireless communication network (i.e., the second communication network 120) may be periodically communicated to the master communication device 102 or the cloud server 116.

At 724, a thermomechanical-induced change may be determined in an alignment of an optical path of the optical routing device 104A with one or more of: the master communication device 102, one or more other optical routing devices, and/or the one or more service communication devices 106. The processor 306 may be further configured to determine the thermomechanical-induced change.

At 726, an automatic alignment of the optical path may be executed when the temperature monitored by the temperature sensor 336 around the optical routing device 104A in the defined indoor area 112 is outside a pre-set range. The processor 306 may be further configured to execute the automatic alignment of the optical path.

At 728, a Laser Beam Network Control (LBNC) instructions may be received from the master communication device 102 or the cloud server 116. The processor 306 may be further configured to receive the LBNC instructions from the master communication device 102 or the cloud server 116 over the one or more RF supervisory links.

At 730, an orientation of the one or more laser beam handling regions 318 in the deflecting surface 320 of the optical routing component 304 may be dynamically adjusted based on the LBNC instructions received from the master communication device 102 or the cloud server 116. The instruction to control the movement of the mounting component 302 may be received from the master communication device 102 or the cloud server 116 via the one or more RF supervisory links. The processor 306 may be further configured to switch and re-align the one or more deflected laser beams 326A1 and 326B1 in a real-time or a near real-time to a different destination device based on a change in the angle or the direction of deflection of the one or more laser beams from the optical routing component 304.

At 732, a polarization of the plurality of laser beams, such as the first laser beam 326A and the second laser beam 326B, may be controlled via the one or more polarizers 342A and 342B of the optical routing device 104A. In an implementation, the one or more beam-splitters 340A and 340B may be extended or retracted from the mounting component 302 based on the LBNC instructions received from the master communication device 102 or the cloud server 116.

At 734, one of the optical path options 312C that may be different fallback laser-link options may be selected when a current optical path option is interrupted. The optical path options 312C may be different fall-back laser-link options available to a given optical routing device, such as the optical routing device 104A, to establish a laser beam connectivity with at least one of: the master communication device 102, one or more other optical routing devices, and/or the one or more service communication devices 106.

Various embodiments of the disclosure may provide the optical routing device 104A (FIGS. 1, 3A, 3B, and 3C). The optical routing device 104A may comprise the mounting component 302 and the optical routing component 304 attached to the mounting component 302. The mounting component 302 may comprise the rechargeable battery 314 to power operations of the optical routing device 104A. The mounting component 302 may further comprise the processor 306 configured to communicate over-the-air with the master communication device 102 or one or more service communication devices 106 via one or more radio frequency (RF) supervisory links. The processor 306 may be further configured to receive an instruction via the one or more RF supervisory links to control a movement of the mounting component 302 along with the optical routing component 304 such that an angle or a direction of deflection of one or more laser beams from the optical routing component 304 is changed. The optical routing component 304 may comprise the one or more laser beam handling regions 318 configured to handle a plurality of laser beams concurrently in which the first laser beam 326A may be deflected via a first region 318A of the one or more laser beam handling regions 318 for downstream data communication in a downstream path and a second laser beam 326B is deflected via a second region 318B of the one or more laser beam handling regions 318 for upstream data communication in an upstream path.

Various embodiments of the disclosure may further provide the optical routing device 104A (FIGS. 1, 3A, 3B, and 3C). The optical routing device 104A may comprise the mounting component 302 and the optical routing component 304 attached to the mounting component 302. The mounting component 302 may comprise the rechargeable battery 314 to power operations of the optical routing device 104A. The mounting component 302 may further comprise the processor 306 configured to communicate over-the-air with the master communication device 102 or one or more service communication devices 106 via one or more radio frequency (RF) supervisory links. The processor 306 may be further configured to receive an instruction via the one or more RF supervisory links to control a movement of the mounting component 302 along with the optical routing component 304 such that an angle or a direction of deflection of one or more laser beams from the optical routing component 304 is changed. The optical routing component 304 may comprise the one or more laser beam handling regions 318 configured to handle a laser beam over-the-air in a laser-beam based wireless communication network for both downstream and upstream data communication with the master communication device 102 and the one or more service communication devices 106.

In accordance with an embodiment, wherein the laser beam may comprise a plurality of data streams modulated in at least one of: a coarse wavelength division multiplexing (CWDM), a dense wavelength division multiplexing (DWDM), or another wavelength division multiplexing, for the downstream and upstream data communication.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

What is claimed is:

1. An optical routing device, comprising:
a mounting component; and
an optical routing component attached to the mounting component,
wherein the mounting component comprises:
a rechargeable battery to power operations of the optical routing device; and
a processor configured to:
communicate over-the-air with a master communication device or one or more service communication devices via one or more radio frequency (RF) supervisory links; and
receive an instruction via the one or more RF supervisory links to control a movement of the mounting component along with the optical routing component such that an angle or a direction of deflection of one or more laser beams from the optical routing component is changed,
and wherein the optical routing component comprises two distinct laser beam handling regions configured to handle a plurality of laser beams concurrently in which a first laser beam in a first wavelength is deflected via a first region of the two distinct laser beam handling regions for downstream data communication in a downstream path and a second laser beam in a second wavelength is deflected via a second region of the two distinct laser beam handling regions for upstream data communication in an upstream path,
and wherein the first laser beam in the first wavelength and the second laser beam in the second wavelength are deflected by the two distinct laser beam handling regions of the optical routing component over-the-air for free-space optical communication among the master communication device and the one or more service communication devices via at least the optical routing device independent of optical fibers.

2. The optical routing device according to claim 1, wherein the first laser beam deflected over-the-air carries a first data signal from the master communication device over the first wavelength, and wherein the second laser beam deflected over-the-air over the second wavelength different from the first wavelength carries one or more second data signals from the one or more service communication devices, and wherein the one or more second data signals correspond to user data associated with a plurality of end-user devices.

3. The optical routing device according to claim 1, wherein the control of the movement of the mounting component along with the optical routing component comprises:
controlling one or more of a pitch rotation of the mounting component along an x-axis that is parallel to a mounting surface of the optical routing device, a yaw rotation of the mounting component along a y-axis orthogonal to the x-axis, or a roll rotation of the mounting component along a z-axis; and
causing an alignment of an optical path among the master communication device, one or more other optical routing devices, and the one or more service communication devices, based on the controlling of the pitch rotation, the yaw rotation, or the roll rotation of the mounting component.

4. The optical routing device according to claim 3, wherein the control of the movement of the mounting component along with the optical routing component further comprises aligning a transmit polarization of the one or more laser beams deflected by the optical routing component based on a destination device when an optical polarization multiplexing is utilized in data communication over a laser beam-based wireless communication network, and wherein the destination device is one of: the master communication device, the one or more other optical routing devices, or the one or more service communication devices.

5. The optical routing device according to claim 1, further comprising one or more sensors configured to measure an orientation and a level of the optical routing component with respect to a reference surface to maintain an alignment of an optical path with one or more of: the master communication device, one or more other optical routing devices, and the one or more service communication devices.

6. The optical routing device according to claim 5, wherein the processor is further configured to communicate the measured orientation, the level, and location data of the optical routing device over the one or more RF supervisory links to the master communication device or a cloud server.

7. The optical routing device according to claim 1, further comprising a temperature sensor, wherein the processor is further configured to determine a thermomechanical-induced change in an alignment of an optical path of the optical routing device with one or more of: the master communication device, one or more other optical routing devices, and the one or more service communication devices.

8. The optical routing device according to claim 7, wherein the processor is further configured to execute an automatic alignment of the optical path when a temperature monitored by the temperature sensor is outside a pre-set range.

9. The optical routing device according to claim 1, wherein the processor is further configured to receive a Laser Beam Network Control (LBNC) instructions from the master communication device or a cloud server.

10. The optical routing device according to claim 9, wherein the processor is further configured to dynamically adjust an orientation of the two distinct laser beam handling regions of the optical routing component, based on the LBNC instructions received from the master communication device or the cloud server.

11. The optical routing device according to claim 1, wherein the instruction to control the movement of the mounting component is received from the master communication device or a cloud server via the one or more RF supervisory links, and wherein the processor is further configured to switch and re-align the one or more laser beams in a real-time or a near real-time to a different destination device based on a change in the angle or the direction of deflection of the one or more laser beams from the optical routing component.

12. The optical routing device according to claim 1, wherein the downstream path corresponds to communication from the master communication device towards the one or more service communication devices via at least the optical routing device, and wherein the upstream path corresponds to communication from one or more end-user devices to the one or more service communication devices and further to the master communication device via at least the optical routing device.

13. The optical routing device according to claim 1, wherein each of the two distinct laser beam handling regions comprises a mirror or a mirror-like surface to deflect a corresponding laser beam.

14. The optical routing device according to claim 1, wherein the optical routing component further comprises one or more beam-splitters, and wherein each beam-splitter is configured to split a laser beam of the plurality of laser beams into two or more laser beams or combine multiple laser beams into a single beam.

15. The optical routing device according to claim 14, wherein the one or more beam-splitters are one of: a free-space optical wavelength splitter or combiner configured to either split an incoming laser beam of a first wavelength into different wavelengths or combine a plurality of incoming laser beams of different wavelengths into a single laser beam of the first wavelength.

16. The optical routing device according to claim 15, wherein the one or more beam-splitters are fixedly mounted on the two distinct laser beam handling regions of the optical routing component.

17. The optical routing device according to claim 15, wherein the one or more beam-splitters are movably mounted in the mounting component independent of the two distinct laser beam handling regions, and wherein the processor is configured to extend or retract the one or more beam-splitters from the mounting component based on a Laser Beam Network Control (LBNC) instructions received from the master communication device or a cloud server.

18. The optical routing device according to claim 1, wherein the optical routing component further comprises a polarizer, and wherein the processor is further configured to control a polarization of the plurality of laser beams via the polarizer.

19. The optical routing device according to claim 1, wherein one of two distinct laser beam handling regions is configured to handle an additional laser beam over-the-air for an optical wireless power transmission to remotely charge a rechargeable battery of each of one or more other optical routing devices and/or the service communication device.

20. The optical routing device according to claim 1, wherein the optical routing device is a passive optical node, and wherein each of the master communication device and the one or more service communication devices is a wireless access point or a wireless router, a home gateway device, a fixed wireless access (FWA) device, or a network controller.

* * * * *